US012691571B2

(12) United States Patent
Wu et al.

(10) Patent No.: US 12,691,571 B2
(45) Date of Patent: Jul. 28, 2026

(54) ROBOT FOR TRANSPORTING CARGO BOXES

(71) Applicant: ZHEJIANG GUOZI ROBOT TECHNOLOGY CO., LTD., Hangzhou (CN)

(72) Inventors: Weifeng Wu, Hangzhou (CN); Yikun Tao, Hangzhou (CN); Hongbo Zheng, Hangzhou (CN); Lingfen Zhu, Hangzhou (CN)

(73) Assignee: Zhejiang Guozi Robot Technology Co, Ltd., Hangzhou (CN)

( * ) Notice: Subject to any disclaimer, the term of this patent is extended or adjusted under 35 U.S.C. 154(b) by 453 days.

(21) Appl. No.: 18/374,049

(22) Filed: Sep. 28, 2023

(65) Prior Publication Data

US 2024/0017395 A1 Jan. 18, 2024

Related U.S. Application Data

(63) Continuation-in-part of application No. 17/850,347, filed on Jun. 27, 2022, now abandoned, which is a
(Continued)

(30) Foreign Application Priority Data

Jul. 31, 2023 (CN) .......................... 202310956378.8

(51) Int. Cl.
B25J 5/00 (2006.01)
B25J 9/16 (2006.01)
(Continued)

(52) U.S. Cl.
CPC .............. B25J 5/007 (2013.01); B25J 9/162 (2013.01); B25J 9/1697 (2013.01); B25J 19/02 (2013.01); B65G 1/0492 (2013.01); B65G 1/1371 (2013.01)

(58) Field of Classification Search
CPC . B25J 5/007; B25J 9/162; B25J 9/1697; B25J 19/02; B25J 9/1687; B65G 1/0492;
(Continued)

(56) References Cited

U.S. PATENT DOCUMENTS

| | | | | |
|---|---|---|---|---|
| 4,492,504 A | * | 1/1985 | Hainsworth | .............. B66F 9/07 414/280 |
| 5,211,523 A | * | 5/1993 | Andrada Galan | ...... B60L 15/38 414/280 |
| 7,850,413 B2 | | 12/2010 | Fontana | |
| 9,002,506 B1 | * | 4/2015 | Agarwal | .............. G06Q 10/087 700/218 |

(Continued)

FOREIGN PATENT DOCUMENTS

| | | |
|---|---|---|
| CN | 102658542 A | 9/2012 |
| CN | 105730956 A | 7/2016 |

(Continued)

OTHER PUBLICATIONS

Translation of International Search Report and Written Opinion issued on Aug. 18, 2017 in corresponding International application No. PCT/CN2017/071280; 5 pages.

*Primary Examiner* — Thomas Randazzo

(74) *Attorney, Agent, or Firm* — Blank Rome LLP

(57) ABSTRACT

A robot for transporting cargo boxes includes a drive unit, a cargo box storing unit and a cargo box delivery unit. The drive unit carries the cargo box storing unit and the cargo box delivery unit and moves them jointly therewith. The cargo box storing unit includes a plurality of cargo box storing spaces. The cargo box delivery unit is coupled to the cargo box storing unit and configured to move along the cargo box storing unit in a vertical direction and transfer the cargo boxes between the cargo box storing spaces and a shelf. The cargo box delivery unit includes a hook-and-pull fork tooth module, which is configured to extend from the cargo box delivery unit into the shelf or the cargo box storing spaces, retract to the cargo box delivery unit and, during an extension or retraction, drive the cargo boxes to move
(Continued)

therewith to transfer the cargo boxes from the cargo box delivery unit to the shelf or the cargo box storing spaces or from the shelf or the cargo box storing spaces to the cargo box delivery unit.

20 Claims, 22 Drawing Sheets

Related U.S. Application Data continuation of application No. 16/466,382, filed as application No. PCT/CN2017/071280 on Jan. 16, 2017, now Pat. No. 11,370,107.

(51) Int. Cl.

| | | |
|---|---|---|
| *B25J 19/02* | (2006.01) | |
| *B65G 1/04* | (2006.01) | |
| *B65G 1/137* | (2006.01) | |

(58) Field of Classification Search

CPC ............... B65G 1/1371; B65G 1/0435; G05B 2219/40006

See application file for complete search history.

(56) References Cited

U.S. PATENT DOCUMENTS

| | | | |
|---|---|---|---|
| 9,540,171 B2 | | 1/2017 | Elazary et al. |
| 9,550,624 B2 | * | 1/2017 | Khodl .................... G06Q 50/40 |
| 11,370,107 B2 | * | 6/2022 | Wu ........................... B25J 19/02 |
| 11,794,996 B2 | * | 10/2023 | Cheng ....................... G06T 7/70 |
| 2008/0166217 A1 | | 7/2008 | Fontana |
| 2011/0194917 A1 | * | 8/2011 | Miksch ............. B23Q 3/15539 |
| | | | 414/222.07 |
| 2016/0236869 A1 | * | 8/2016 | Kimura ................ B65G 1/1378 |
| 2018/0082162 A1 | * | 3/2018 | Durham .............. B65G 1/1375 |
| 2018/0127212 A1 | * | 5/2018 | Jarvis ..................... G05D 1/247 |
| 2020/0207546 A1 | * | 7/2020 | Borders ................ B65G 67/02 |
| 2022/0274779 A1 | * | 9/2022 | Qian .................... B65G 1/0435 |
| 2024/0067447 A1 | * | 2/2024 | He ........................... B66F 9/142 |

FOREIGN PATENT DOCUMENTS

| | | | |
|---|---|---|---|
| CN | 205555211 | U | 9/2016 |
| CN | 106005862 | A | 10/2016 |
| CN | 106272415 | | 1/2017 |
| GB | 2336838 | A | 11/1999 |
| JP | H10958814 | A | 8/2017 |
| WO | 2016151504 | A1 | 9/2016 |
| WO | 2016151505 | A1 | 9/2016 |

* cited by examiner

7042

7043

ROBOT FOR TRANSPORTING CARGO BOXES

RELATED APPLICATIONS

This application is a continuation-in-part (CIP) application claiming benefit of U.S. patent application Ser. No. 17/850,347 filed on Jun. 27, 2022, which is a continuation application of U.S. patent application Ser. No. 16/466,382, filed Jun. 4, 2019, now U.S. Pat. No. 11,370,107, issued Jun. 28, 2022, which is a national phase application of PCT/CN2017/071280 filed on Jan. 16, 2017. This application also claims priority to Chinese Patent Application No. 202310956378.8 filed on Jul. 31, 2023. The disclosures of those applications are incorporated herein in their entirety by reference.

FIELD OF THE INVENTION

The invention relates to the field of warehousing and logistics, particularly to a robot for transporting cargo boxes.

DESCRIPTION OF THE PRIOR ART

A transporting robot is a device applied to automated materials transporting, having many advantages such as high automaticity, flexible applications, safety & reliability, high efficiency and convenient maintenance, and the like, and finds its broad applications in the field of logistics and transportation in auto manufacturing industries, food industries, tobacco industries and engineering and machinery industries and the like. In addition, transporting robots are widely applied in various public service places such as airports, hospitals and office buildings. Meanwhile, these advantages make the transporting robot key equipment in modern logistics systems and become one of the important members in the program of "machine substitution for human labor".

The concept of "shelves coming to human" proposed by the KIVA company has achieved great success, whose structure and method are stated in detail in the U.S. Pat. No. 7,850,413B2. Therefore, many unmanned transporting robots using the concept of "shelves coming to people" are emerging in China, which also have good effects. However, in order to fetch one piece of goods, the KIVA robot needs to transport the whole shelf to a picking area, which causes great wasting of resources.

Most existing transporting robots usually have only one telescopic stage for handling stored goods. Generally, such a robot has a telescopic means consisting of two linked arms: a non-telescopic base arm and a telescopic arm for handling cargo boxes. When used to handle goods stored on a fixed shelf, this configuration can only access goods placed at exterior sides of the shelf but not those disposed deep in the shelf. This would reduce utilization of the shelf and hence the warehousing site where the shelf is deployed. The ever-increasing demands for improved transportation techniques and more reasonable shelf layouts in warehousing sites are making the existing approach that handles stored goods with only one telescopic arm increasingly difficult to meet the sites' requirements.

More and more modern warehouses begin to utilize higher shelves for more complete storage space utilization and higher goods storage capacity. Accordingly, more and more existing transporting robots are endowed with the ability to reach greater heights, in order to access goods stored at the top of those shelves. However, this could be problematic because increases in height mean greater tendency of such transporting robots to suffer from gantry wobbling when handling goods positioned at high places. This can heavily affect operation of the transporting robots and may create potential safety hazards.

Therefore, to overcome the defect of fetching only one piece of goods at a time for the KIVA robot, persons skilled in the art devote to developing a robot for transporting cargo boxes, which can transport various kinds of goods at a time, thereby increasing the transport efficiency of the transporting robot. Handling stored goods with multiple telescopic members allows higher shelf utilization and can prevent gantry wobbling during pickup of goods, resulting in increased safety and reliability.

SUMMARY OF THE INVENTION

In view of the above defects in the prior art, the technical problem to be solved by the invention is how to increase the transporting efficiency of the transporting robot. Since the cargo boxes are to be transported, whose volumes and weights are much less than those of the shelves, a plurality of cargo boxes can be transported at a time. A single cargo box at least stores one kind of goods, so various kinds of goods can be transported at a time.

In order to achieve the above aim, the present invention provides a robot for transporting cargo boxes, including a drive unit, a cargo box storing unit and a cargo box delivery unit, wherein the drive unit drives the cargo box storing unit and the cargo box delivery unit to move together; the cargo box storing unit includes one or more cargo box storing spaces; the cargo box delivery unit is configured to deliver the cargo box between the cargo box storing space and the shelf.

Further, the drive unit includes a chassis frame and drive wheels, and the drive wheels are configured to drive the robot to move or stop.

Further, the movement includes advancing, retreating, turning and spinning.

Further, the number of the drive wheels is two or more.

Further, the cargo box storing unit includes a supporting guide rail, a support plate and a reinforcing rib, wherein the supporting guide rail, the support plate and the reinforcing rib are connected mutually to form one or more cargo box storing spaces.

Further, the support plate is configured to divide the storing space.

Further, the cargo box delivery unit includes a lifting device, a rotational device and a retractor device, wherein one end of the lifting device is connected to the supporting guide rail and is slidable up and down in a vertical direction along the supporting guide rail, and the other end of the lifting device is connected to the retractor device by the rotational device.

Further, the retractor device is a fork tooth.

Further, the cargo box storing space and the cargo box are provided with machine-readable codes, and the cargo box delivery unit further includes an alignment sensor and a pose sensor.

Further, the machine-readable code is a bar code or a two-dimensional code, or a character string or an RFID.

Further, the alignment sensor is configured to detect the position of the cargo box, and the alignment sensor is a vision sensor or a radio frequency sensor.

Further, the pose sensor is configured to detect the pose of the cargo box on the cargo box delivery unit, and the pose sensor is a vision sensor or a radio frequency sensor.

Further, the support plate is an integral flat plate, or has hollows or partitions.

The procedure for the robot for transporting cargo boxes of the present invention to transport the cargo boxes to the cargo box storing unit are as follows: the transporting robot moves the cargo box delivery unit to a specified position by the lifting device, while the retractable fork tooth is rotated to a specified angle by the rotational device and extends underneath the cargo box to be transported, the cargo box is lifted by the lifting device, and the cargo box is retracted by the retractable fork tooth, and then the retractable fork tooth and the cargo box are rotated to another specified angle by the rotational device, and the cargo box is moved onto the support plate by the retractable fork tooth, and the cargo box is lowered by the lifting device and placed on the support plate, and finally the retractable fork tooth is retracted. Therefore, the robot for transporting cargo boxes of the present invention can transport various kinds of goods at a time, with high work efficiency and low energy consumption.

The present invention also provides a robot for transporting cargo boxes with multiple telescopic arms and self-adaptivity to cargo box widths, which can additionally increase storing space utilization of a warehouse and enhance transporting efficiency. A robot for transporting cargo boxes according to the present invention comprises a drive unit, a cargo box storing unit and a cargo box delivery unit, wherein the drive unit carries the cargo box storing unit and the cargo box delivery unit and moves them jointly therewith; the cargo box storing unit comprises a plurality of cargo box storing spaces; the cargo box delivery unit is coupled to the cargo box storing unit and configured to move along the cargo box storing unit in a vertical direction and transfer the cargo boxes between the cargo box storing spaces and a shelf, wherein the cargo box delivery unit comprises a hook-and-pull fork tooth module, the hook-and-pull fork tooth module configured to extend from the cargo box delivery unit into the shelf or the cargo box storing spaces, retract to the cargo box delivery unit and, during an extension or retraction, drive the cargo boxes to move therewith to transfer the cargo boxes from the cargo box delivery unit to the shelf or the cargo box storing spaces or from the shelf or the cargo box storing spaces to the cargo box delivery unit.

Additionally, the hook-and-pull fork tooth module comprises a telescopic fork tooth device having at least one telescopic stroke, the telescopic fork tooth device comprising a fixed fork tooth and at least one telescopically movable fork tooth provided at an inner side of the fixed fork tooth, the movable fork tooth configured to extend or retract in a lengthwise direction of the fixed fork tooth.

Additionally, the hook-and-pull fork tooth module further comprises a swinging rod device, the swinging rod device disposed on a movable fork tooth corresponding to a last stage stroke of the telescopic stroke and located at an end of the movable fork tooth where it is disposed directed toward a direction of extension, the swinging rod device comprising a swinging rod pivotable relative to the direction of exten-sion.

Additionally, the hook-and-pull fork tooth module further comprises a push plate, the push plate disposed on the movable fork tooth corresponding to the last stage stroke of the telescopic stroke and located at an end of the movable fork tooth where it is disposed directed away from the direction of extension, the push plate configured to push a cargo box in the cargo box delivery unit during its move-ment with the movable fork tooth.

Additionally, the cargo box delivery unit further com-prises an extension-retraction drive module for driving the hook-and-pull fork tooth module to telescope, the extension-retraction drive module comprising a drive component and a transmission mechanism coupled to the drive component, the transmission mechanism coupled to the movable fork tooth.

Additionally, the telescopic fork tooth device comprises an inner fork tooth, an intermediate fork tooth and an outer fork tooth, the outer fork tooth serving as the fixed fork tooth, the intermediate fork tooth disposed at an inner side of the outer fork tooth and configured to be extendible and retractable, the inner fork tooth disposed at an inner side of the intermediate fork tooth and configured to be extendible and retractable, the swinging rod device disposed at an end of the inner fork tooth directed toward the direction of extension, the push plate disposed at an end of the inner fork tooth directed away from the direction of extension, the intermediate fork tooth coupled to the transmission mecha-nism.

Additionally, the intermediate fork tooth is provided thereon with a first timing pulley, a tensioning means, a timing belt and a second timing pulley, the first timing pulley and the second timing pulley disposed respectively on opposite ends of the intermediate fork tooth along the direction of extension, the timing belt wound into an open ring, with its opposite ends being both secured to the tensioning means, the tensioning means fixed at a side between the intermediate fork tooth and the inner fork tooth, central positions of the opposite ends of the timing belt aligned with central positions of the first timing pulley and the second timing pulley.

Additionally, the telescopic fork tooth device comprises the fixed fork tooth, a first fork tooth, a second fork tooth and a third fork tooth, the first fork tooth disposed at an inner side of the fixed fork tooth and configured to be extendible and retractable, the second fork tooth disposed at an inner side of the first fork tooth and configured to be extendible and retractable, the third fork tooth disposed at an inner side of the second fork tooth and configured to be extendible and retractable, the swinging rod device disposed at an end of the third fork tooth directed toward the direction of extension, the push plate disposed at an end of the third fork tooth directed away from the direction of extension, the first fork tooth coupled to the transmission mechanism.

Additionally, the first fork tooth and the second fork tooth both comprise a third timing pulley, a tensioning means, a timing belt and a fourth timing pulley, the third timing pulleys and the fourth timing pulleys disposed at opposite ends of the first fork tooth and the second fork tooth, respectively, the tensioning means respectively mounted to the fixed fork tooth and the first fork tooth, the timing belts wound into open rings with their opposite ends being secured to the tensioning means, the tensioning means fixed at a middle position between the fixed fork tooth and the first fork tooth and at a middle position between the first fork tooth and the second fork tooth, central positions of opposite ends of the timing belts aligned with central positions of the third timing pulleys and the fourth timing pulleys.

Additionally, the cargo box delivery unit further com-prises a follower mechanism, which is used to carry the cargo boxes and configured to move with the telescopic fork tooth device into abutment with the shelf.

Additionally, the cargo box delivery unit further com-prises an extension-retraction slide rail module, the extension-retraction slide rail module comprising a slide rail and at least one slider slideable on the slide rail, the slider coupled to the follower mechanism so that the follower mechanism slide on the slide rail.

Additionally, the fixed fork tooth is configured to be movable in a direction perpendicular to the direction of extension, thereby adapting a width of the hook-and-pull fork tooth module to a cargo box of a different width.

Additionally, the cargo box delivery unit further comprises a clamp holding drive module, the clamp holding drive module comprising a drive component and a transmission mechanism, the drive component coupled to the transmission mechanism, the transmission mechanism coupled to the fixed fork tooth, the clamp holding drive module configured to drive the fixed fork tooth to move in the direction perpendicular to the direction of extension.

Additionally, the cargo box delivery unit further comprises a clamp holding slide rail module, the clamp holding slide rail module comprising a guide rail and a slider slideable on the guide rail, the slider coupled to the fixed fork tooth so that the fixed fork tooth slide on the guide rail.

Additionally, the cargo box delivery unit comprises an underframe and a baseplate, the baseplate disposed on the underframe, the hook-and-pull fork tooth module disposed on the baseplate, the underframe provided thereon with a rotational device configured to be able to drive the baseplate to rotate, thereby causing the hook-and-pull fork tooth module to rotate to a predetermined angle.

Additionally, the drive unit comprises a chassis frame, a first drive assembly and a second drive assembly disposed in opposition to each other on the chassis frame, and a cantilever assembly disposed at a front end of the chassis frame, the first drive assembly comprising a first cantilever articulated to a bearing seat, the second drive assembly comprising a second cantilever articulated to a bearing seat, the cantilever assembly comprising a third cantilever articulated to a bearing seat, center points of articulation of the first cantilever, the second cantilever and the third cantilever defining a triangular articulating structure.

Additionally, the cargo box storing unit comprises a gantry module, a lifting module, a lifting-drive module and a gantry mounting module, the gantry module comprising the plurality of cargo box storing spaces which are arranged in a vertical direction, the lifting module disposed on one side of the gantry module, coupled to the cargo box delivery unit and configured to drive the cargo box delivery unit move in the vertical direction, the lifting-drive module coupled to the lifting module and configured to drive the lifting module to move, the gantry mounting module disposed at a bottom of the gantry module and fixedly coupled to the chassis frame.

Additionally, the robot further comprises an aerial stabilization mechanism fixedly coupled to the cargo box delivery unit and configured to abut against shelves/walls on opposite sides of the robot.

Additionally, the aerial stabilization mechanism comprises a mounting/fixation plate coupled to the cargo box delivery unit, the mounting/fixation plate disposed therein with a pair of support assemblies, the support assemblies configured to extend out of the mounting/fixation plate through openings at opposite ends thereof to abut against the shelves/walls.

Additionally, the aerial stabilization mechanism further comprises a drive assembly and a transmission mechanism, all the drive assembly, the transmission mechanism, the middle fixation base and the shaft end fixation bases mounted to the mounting/fixation plate,

the drive assembly comprising a motor, a drive pulley coupled to the motor, and a driven pulley coupled to the drive pulley, the transmission mechanism comprising a bidirectional lead screw, a guide shaft and a guide seat, the guide seat comprising a guide base and a screw nut disposed within the guide base, the bidirectional lead screw coupled to the driven pulley, the bidirectional lead screw disposed in the guide base and threadedly engaged with the screw nut of the guide seat, the guide shaft disposed in parallel to the bidirectional lead screw, the guide base fitter over the guide shaft, the support assemblies each comprising a support shaft and a support plate disposed at an end of the support shaft, one end of the support shaft coupled to the guide seat and moving forth and back with the guide seat.

A goods transportation process performed by the robot of the present invention includes the step as follows.

1. Transportation of a cargo box from a shelf to the cargo box storing unit involves movement of the robot by means of the drive unit to a location in front of the specific shelf. The lifting device then moves the cargo box delivery unit to a specified height of the shelf, and the cargo box delivery unit is rotated so that the hook-and-pull fork tooth module in the cargo box delivery unit is directed toward the cargo box. The telescopic fork tooth device extends out of the hook-and-pull fork tooth module and passes through opposite sides of the cargo box, and the swinging rod of the swinging rod device pivots to an orientation in which it forms an angle with the fork teeth. In this way, the cargo box is together surrounded by the swinging rod, the fork teeth and the push plate. At the same time, the follower mechanism is in abutment with the shelf. Retracting the telescopic fork tooth device will cause the swinging rod to come into contact with the cargo box and pull it onto the follower mechanism.

The lifting device moves the cargo box delivery unit to a specified height of the cargo box storing unit, and the cargo box delivery unit is rotated so that an opening defined by the hook-and-pull fork tooth module is directed toward a specified one of the cargo box storing spaces of the cargo box storing unit. The telescopic fork tooth device extends toward the cargo box storing space, and the follower mechanism moves in response. As a result, the push plate pushes the cargo box into the cargo box storing space. After that, the telescopic fork tooth device is retracted, thereby completing the process.

2. A cargo box can be transported from the cargo box storing unit to a shelf following the substantially same process as described above.

3. When the telescopic fork tooth device detects the presence of a cargo box and determines its width, the telescopic fork tooth device can adapt its width to that of the cargo box. This makes the robot suitable for use in handling cargo boxes of various widths. After the width adjustment is completed, steps 1 and 2 may be performed to transfer the cargo box.

The robot of the present invention has the benefits as follows:

1. The three cantilevers in the drive unit are articulated to the respective bearing seats, and their points of articulation define a triangular articulating structure, which makes the drive unit more stable.

2. The follower mechanism added to the cargo box delivery unit can abut against a shelf which is spaced apart from the robot by a distance, resulting in an increase rate of success in cargo retrieval and placement.

3. The fork tooth device having multiple telescopic stages can access cargo placed deep in a shelf. This allows more cargo boxes to be stored on a single layer of the shelf, enhancing utilization of a warehouse in which the shelf is deployed.

4. The fork tooth device design with adaptability to cargo boxes of various widths broads the scope of application of the invention, enhances versatility of the robot and increase its cargo retrieval and placement efficiency.

5. The aerial stabilization mechanism added to the robot can ensure safe cargo retrieval and placement at a high location, allowing higher shelves to be deployed in a warehouse. This can result in higher utilization and efficiency of the warehouse.

The concepts, specific structure and resultant technical effects of the present invention are further explained below in combination with drawings, so as to fully understand the object, features and effects of the present invention.

Figure 1:
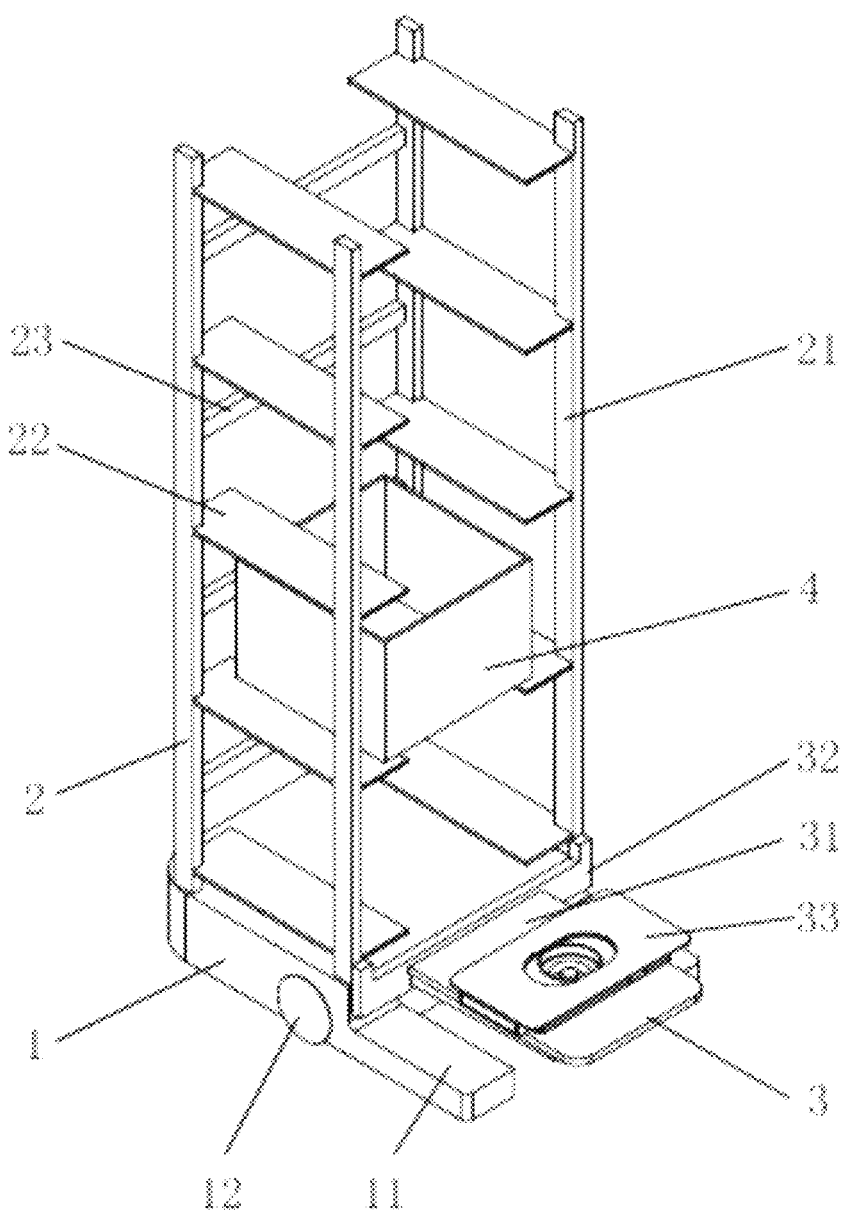
FIG. 1 is a perspective diagram of the transporting robot of one preferable embodiment of the present invention.

In these figures, 1 denotes a drive unit; 11, a chassis frame; 12, a drive wheel;

2, a cargo box storing unit; 21, a supporting guide rail; 22, a support plate;

3, a cargo box delivery unit; 31, a mounting frame; 32, a lifting device; 33, a retractable fork tooth; 34, a rotational device; 35, a pose sensor; 36, an alignment sensor;

4, a cargo box; 40, a shelf;

110, a chassis frame; 111, a standing plate; 112, a drive wheel; 113, a drive motor; 114, a traveling drive unit; 115, a driven pulley; 116, a bearing seat; 117, a triangle; 120, a first drive assembly; 121, a first cantilever; 130, a second drive assembly; 131, a second cantilever; 140, a cantilever assembly; 141, a third cantilever; 151, an alignment sensor; 152, a laser module;

210, a gantry module; 211, a cargo box storing space; 212, a gantry shelf panel; 213, a gantry cross piece; 214, a gantry upright; 220, a lifting module; 221, a first timing belt; 222, an idler pulley; 223, a guide wheel; 224, a side slider; 225, a tensioner; 226, a lifting plate; 230, a lifting-drive module; 231, a drive component; 232, a speed reducer; 233, a transmission shaft; 234, a drive pulley; 240, a gantry mounting module; 241, a mounting plate; 242, a mounting baseplate; 243, a first anti-slippage means; 244, a lifting stop plate; 250, a gantry top plate; 251, a second anti-slippage means; 252, a signal module; 253, a light strip; 261, a drag chain mounting plate; 262, a drag chain; 263, a grip;

310, an underframe; 311, a baseplate; 312, a side cover; 313, a rear over; 314, an opening; 320, a hook-and-pull fork tooth module; 321, a swinging rod device; 3211, a swinging rod; 3212, a path detection sensor; 3213, a swinging rod stopper; 3214, a coupling; 3215, a swinging rod motor; 322, a telescopic fork tooth device; 3221, an inner fork tooth; 3222, an intermediate fork tooth; 3223, an outer fork tooth; 32221, a first timing pulley; 32222, a tensioning means; 32223, a second timing belt; 32224, a second timing pulley; 32225, an L-shaped stop tab; 323, a push plate; 330, an extension-retraction drive module; 331, a drive component; 332, a first transmission sprocket; 333, a chain; 334, a second transmission sprocket; 335, an intermediate transmission gear; 336, a main drive gear; 340, an extension-retraction slide rail module; 341, a first slider; 342, a slide rail; 343, a second slider; 350, a follower mechanism; 351, a plate-shaped member; 352, a rubber pad; 353, a spring; 360, a rotational device; 361, a rotation stop sensor; 371, a hook-and-pull pose sensor; 372, a cargo box detection sensor;

420, a double-telescoping hook-and-pull fork tooth module; 421, a double-telescoping swinging rod device; 422, a double-telescoping fork tooth device; 4221, a fixed fork tooth; 4222, a first fork tooth; 4223, a third fork tooth; 4224, a third fork tooth; 42231, a third timing pulley; 42232, a tensioning means; 42233, a third timing belt; 42234, a fourth timing pulley; 423, a push plate; 424, a slide rail groove; 425, a slide rail; 41, a first position; 42, a second position;

510, an underframe; 511, a baseplate; 513, a rear over; 514, a side cover; 520, a hook-and-pull fork tooth module; 521, a swinging rod device; 5211, a swinging rod; 5212, a swinging rod stopper; 5213, a coupling; 5214, a swinging rod motor; 522, a telescopic fork tooth device; 5221, an inner fork tooth; 5222, an intermediate fork tooth; 5223, an outer fork tooth, 52221, a first timing pulley; 52222, a tensioning means; 52223, a second timing belt; 52224, a second timing pulley; 523, a push plate; 524, a cargo box stop plate; 530, an extension-retraction drive module; 531, a chain idler pulley assembly; 5311, a tensioning shaft; 5312, a chain idler pulley; 532, a chain; 5321, a coupling block; 533, a bearing seat; 534, a rotating and sliding unit; 5341, a sliding seat; 5342, a rotating sprocket; 535, an extension-retraction drive unit; 5351, a drive motor; 5352, a gear assembly; 536, a rotating shaft; 540, an extension-retraction slide rail module; 541, a first slider; 542, a slide rail; 543, a second slider; 550, a follower mechanism; 551, a plate-shaped member; 552, a rubber pad; 560, a rotation drive module; 561, a rotational device; 562, a rotation stop sensor; 563, a rotation drive unit; 5631, a rotation drive motor; 5632, a rotation drive bracket; 5633, a rotation drive sprocket; 564, a rotation drive chain; 571, a pose sensor; 572, a shape sensor; 573, a path detection sensor; 574, a signal sensor; 575, a cargo box detection sensor; 580, a clamp holding drive module; 581, a drive unit; 5811, a drive motor; 5812, a timing pulley; 5813, a drive bracket; 582, a timing belt idler pulley assembly; 5821, an idler pulley bracket; 5822, an idler pulley; 583, a timing belt unit; 5831, a timing belt; 5832, a clamp holding coupling block; 5833, a timing belt tensioner; 590, a clamp holding slide rail module; 591, a first clamp holding slider; 592, a second clamp holding slider; 593, a clamp holding slide rail; 594, a clamp holding slider connector;

621, a double-telescoping swinging rod device; 622, a double-telescoping fork tooth device; 6221, a fixed fork tooth; 6222, a first fork tooth; 6223, a second fork tooth; 6224, a third fork tooth; 62231, a third timing pulley; 62232, a tensioning means; 62233, a third timing belt; 62234, a fourth timing pulley; 623, a push plate; 624, a slide rail groove; 625, a slide rail; 7, an aerial stabilization mechanism; 701, a mounting/fixation plate; 7011, a cavity; 7012, an opening; 702, a drive assembly; 7021, a drive motor; 7022, a drive pulley; 7023, a driven pulley; 703, a transmission mechanism; 7031, a bidirectional lead screw; 7032, a guide shaft; 7033, a guide seat; 70331, a screw nut; 70332, a guide base; 704, a support assembly; 7041, a support shaft; 7042, a support plate; 7043, a resilient element; 7051, a middle fixation base; 7052, a shaft end fixation base; and 706, a sensor.

DETAILED DESCRIPTION OF THE PREFERRED EMBODIMENTS

The present invention will be described more fully hereinafter with reference to the accompanying drawings, in which two preferred embodiments of the invention are shown, for the purpose of clarity and better understanding of the techniques. This invention may be embodied in various different forms and the invention should not be construed as being limited to the embodiments set forth herein.

In the accompanying drawings, elements with identical structure are marked with the same reference numerals, and like elements with similar structure or function are marked throughout with like reference numerals, respectively. The dimension and thickness of each of the elements in the accompanying drawings are arbitrarily shown, and are not defined. Certain elements may be shown somewhat exaggerated in thickness in the interest of clarity.

It will be understood that when an element is referred to as being "on" another element, it can be directly on the other element, or there may be an intermediate element to which it is attached, and the intermediate element is attached to the other element. When an element is referred to as being "mounted to" or "connected to" another element, either one can be understood as being directly "mounted" or "connected" thereto, or via an intermediate element to be indirectly "mounted to" or "connected to" the other element.

EXAMPLE 1

Figure 2:
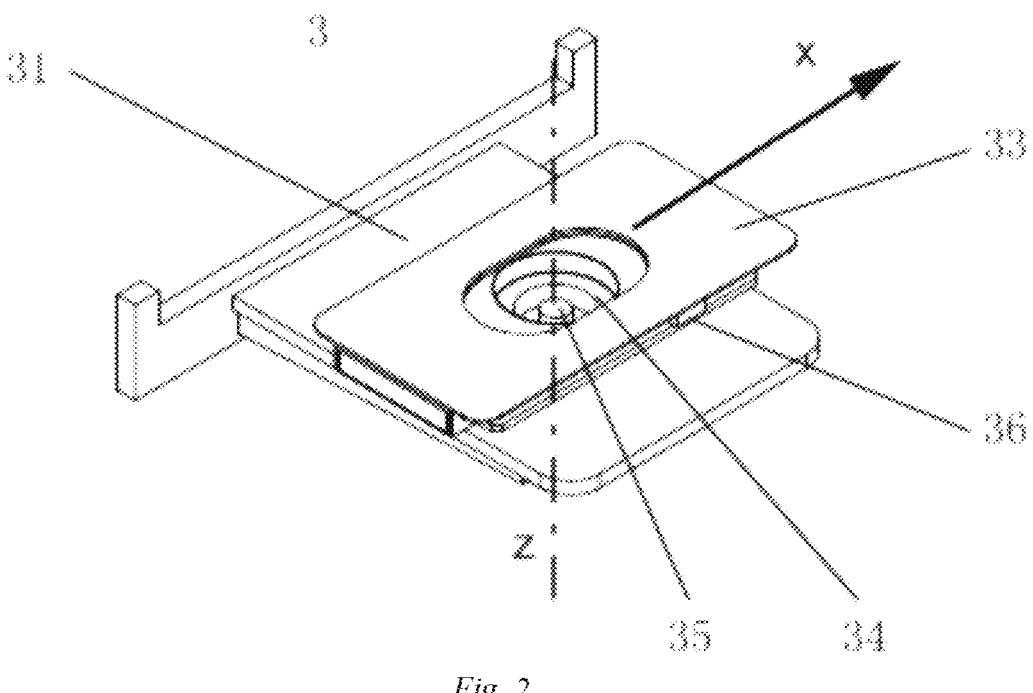
FIG. 2 is a perspective diagram of the cargo box delivery unit of one preferable embodiment of the present invention.

As shown in FIG. 1 and FIG. 2, a robot for transporting cargo boxes includes: a drive unit 1, a cargo box storing unit 2, and a cargo box delivery unit 3.

(1) The drive unit 1 is used for driving the cargo box storing unit 2 and the cargo box delivery unit 3 mounted thereon to move on the ground together.

(2) The cargo box storing unit 2 is mounted above the drive unit 1, for storing the cargo boxes 4.

(3) The cargo box delivery unit 3 is mounted to one side of the cargo box storing unit 2, for delivering the cargo box 4 into or out from the cargo box storing unit 2, to a specified position.

The drive unit 1 includes a chassis frame 11 and drive wheels 12, wherein the number of the drive wheels 12 is two, and the drive wheels are symmetrically mounted to two sides of the chassis frame 1. The advancing, retreating, turning and spinning of the robot can be achieved through rotations of the drive wheels 12.

The cargo box storing unit 2 includes supporting guide rails 21, support plates 22 and reinforcing ribs 23, wherein the supporting guide rails 21 are positioned above the drive unit 1, and the supporting guide rails 21 are connected with each other through the support plates 22 and the reinforcing ribs 23, and the support plates 22 are used for stacking the cargo boxes.

The cargo box storing unit 2 can store a plurality of cargo boxes.

The support plates 22 are spaced apart from each other.

The cargo box delivery unit 3 includes a frame 31, a lifting device 32, a retractable fork tooth 33 and a rotational device 34, wherein one end of the lifting device 31 is connected to the supporting guide rail 21, and is slidable up and down in a vertical direction along the supporting guide rail 21, and the other end of the lifting device 32 is connected to the retractable fork tooth 33 by the rotational device 34.

The retractable fork tooth 33 is rotatable along the z axis by the rotational device 34.

The retractable fork tooth 33 is extendable or retractable in the x direction. If the rotational device 34 drives the retractable fork tooth 33 to rotate, the telescoping direction of the retractable fork tooth 33 rotates accordingly therewith.

The cargo box delivery unit 3 further includes a pose sensor 35 for identifying the pose of the cargo box above the retractable fork tooth 33, and an alignment sensor 36 for detecting the position of the cargo box.

The pose sensor 35 may be a vision sensor or other sensors capable of acquiring the pose information.

The alignment sensor 36 may be a vision sensor or other sensors capable of acquiring the pose information.

A procedure for a robot for transporting cargo boxes to transport the cargo boxes 4 to the cargo box storing unit 2 is as follows: the robot moves the cargo box delivery unit 3 to a specified position by the lifting device 32, meanwhile the retractable fork tooth 33 is rotated to a specified angle by the rotational device 34 and extends underneath the cargo box 4 to be transported, and the cargo box 4 is lifted by the lifting device 32, and the cargo box 4 is retracted by the retractable fork tooth 33, and the retractable fork tooth 33 and the cargo box 4 are rotated to another specified angle by the rotational device 34, and then the cargo box 4 is moved onto the support plate 22 by the retractable fork tooth 33, and then the cargo box 4 is lowered by the lifting device 32 and placed on the support plate 22, and finally the retractable fork tooth 33 is retracted.

EXAMPLE 2

Figure 3:
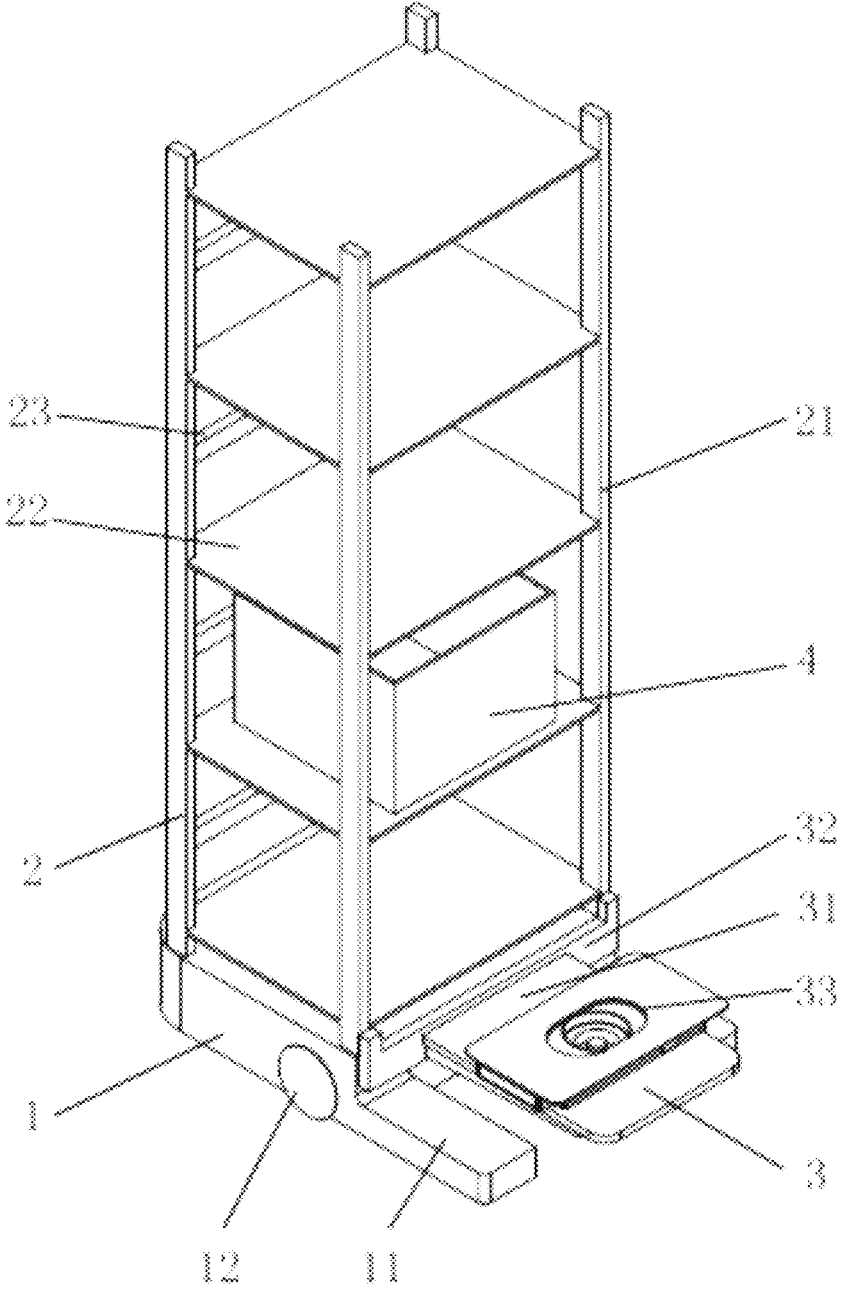
FIG. 3 is a perspective diagram of the transporting robot of another preferable embodiment of the present invention.

As shown in FIG. 2 and FIG. 3, a robot for transporting cargo boxes includes: a drive unit 1, a cargo box storing unit 2, and a cargo box delivery unit 3.

(1) The drive unit 1 is used for driving the cargo box storing unit 2 and the cargo box delivery unit 3 mounted thereon to move on the ground together.

(2) The cargo box storing unit 2 is mounted above the drive unit 1, for storing the cargo boxes 4.

(3) The cargo box delivery unit 3 is mounted at one side of the cargo box storing unit 2, for delivering the cargo box 4 into or out the cargo box storing unit 2, to a specified position.

The drive unit 1 includes a chassis frame 11 and drive wheels 12, wherein the number of the drive wheels 12 is two, and the drive wheels 12 are symmetrically mounted to two sides of the chassis frame 11. The advancing, retreating, turning and spinning of the robot can be achieved through rotations of the drive wheels 12.

The cargo box storing unit 2 includes supporting guide rails 21, support plates 22 and reinforcing ribs 23, wherein the supporting guide rails 21 are positioned above the drive unit 1, and are connected with each other through the support plates 22 and the reinforcing ribs 23, and the support plates 22 are used for stacking the cargo boxes.

The cargo box storing unit 2 can store a plurality of cargo boxes.

The support plate 22 is a flat plate for connecting the supporting guide rails 21 at the two sides.

The cargo box delivery unit 3 includes a frame 31, a lifting device 32, a retractable fork tooth 33 and a rotational device 34, wherein one end of the lifting device 31 is connected to the supporting guide rail 21, and is slidable up and down in a vertical direction along the supporting guide rail 21, and the other end of the lifting device 32 is connected to the retractable fork tooth 33 by the rotational device 34.

The retractable fork tooth 33 is rotatable along the z axis by the rotational device 34.

The retractable fork tooth 33 is extendable or retractable in the x direction. If the rotational device 34 drives the retractable fork tooth 33 to rotate, the telescoping direction of the retractable fork tooth 33 rotates accordingly therewith.

The cargo box delivery unit 3 further includes a pose sensor 35 for identifying the pose of the cargo box above the retractable fork tooth 33, and an alignment sensor 36 for detecting the position of the cargo box.

The pose sensor 35 may be a vision sensor or other sensors capable of acquiring the pose information, for example a radio frequency sensor.

The alignment sensor 36 may be a vision sensor or other sensors capable of acquiring the pose information, for example a radio frequency sensor.

A procedure for a robot for transporting cargo boxes to transport the cargo boxes 4 to the cargo box storing unit 2 is as follows. The robot moves the cargo box delivery unit 3 to a specified position by the lifting device 32, meanwhile the retractable fork tooth 33 is rotated to a specified angle by the rotational device 34 and extended underneath the cargo box 4 to be transported, and the cargo box 4 is lifted by the lifting device 32, and the cargo box 4 is retracted by the retractable fork tooth 33, and the retractable fork tooth 33 and the cargo box 4 are rotated to another specified angle by the rotational device 34, and the cargo box 4 is moved onto the support plate 22 by the retractable fork tooth 33, and then the cargo box 4 is lowered by the lifting device 32 and placed on the support plate 22, and finally the retractable fork tooth 33 is retracted.

EXAMPLE 3

FIGS. 4 to 15 show a third embodiment.

Figure 4:
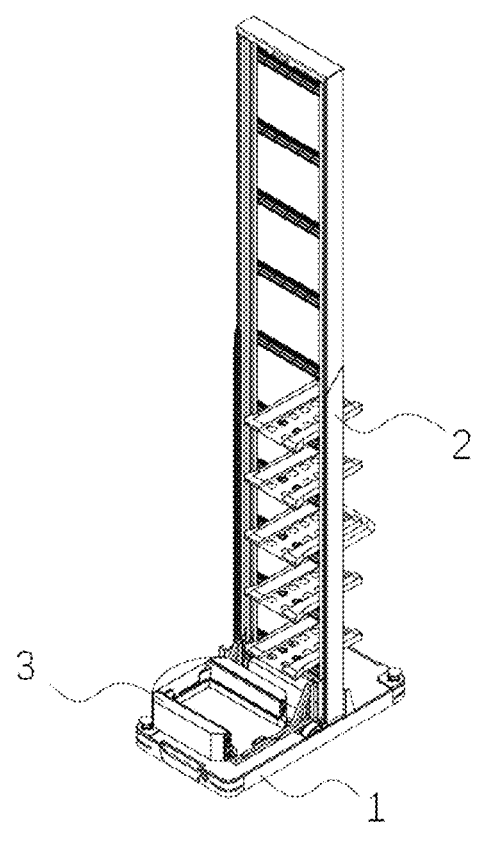
FIG. 4 is a perspective view of a transporting robot according to a third embodiment of the present invention.

As shown in FIG. 4, this embodiment provides a robot for transporting cargo boxes, which includes a drive unit 1, a cargo box storing unit 2 and a cargo box delivery unit 3. The cargo box storing unit 2 is mounted on the drive unit 1, and the cargo box storing unit 2 has a plurality of cargo box panels for storing thereon cargo boxes, which are arranged in layers along a direction perpendicular to the drive unit 1. The cargo box delivery unit 3 is mounted on one side of the cargo box storing unit and movable up and down in a vertical direction along the cargo box storing unit 2 to reach a specified height where it can be transferred between a specified layer of a shelf 40 and a specified layer of the cargo box storing unit 2. The drive unit 1 is used to move on the ground, while carrying the cargo box storing unit 2 and the cargo box delivery unit 3 mounted thereon, as a whole.

Figure 5:
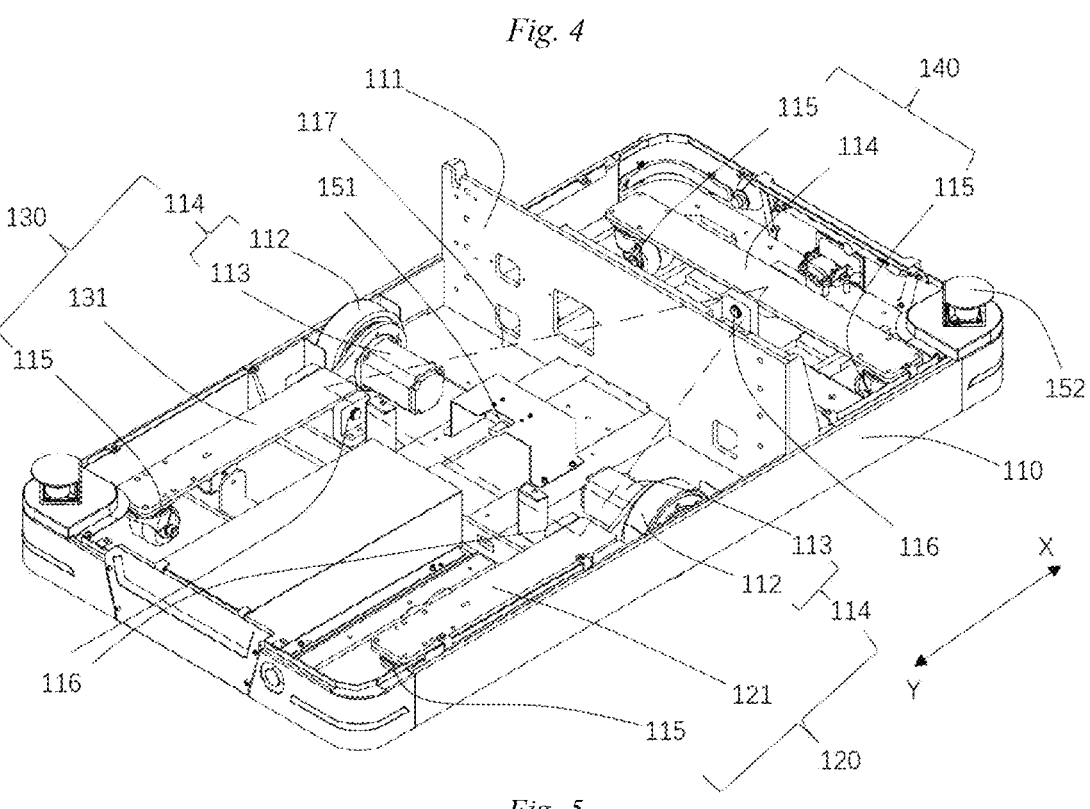
FIG. 5 is a diagram showing the structure of a drive unit in the robot of the third embodiment.

As shown in FIG. 5, the drive unit 1 includes a chassis frame 110, a first drive assembly 120, a second drive assembly 130, a standing plate 111, a cantilever assembly 140, a sensor assembly and a power supply module. The chassis frame 110 serves as a support for the entire drive unit 1 and all the components of the drive unit 1 are mounted to the chassis frame 110. The first drive assembly 120 is mounted at one side of the chassis frame 110, and the second drive assembly 130 is mounted at an opposite side of the chassis frame 110 to the first drive assembly 120. The first drive assembly 120 and the second drive assembly 130 are located in symmetrical positions. The first drive assembly 120 and the second drive assembly 130 are used to effect advancing, retreating, turning and spinning of the drive unit 1. Preferably, the first drive assembly 120 and the second drive assembly 130 are of the same structure and both include a traveling drive unit 114 composed of a drive wheel 112 and drive motor 113 coupled to the drive wheel 112. The drive wheel 112 can be driven by the drive motor 113 to rotate. Rotation of the two drive wheels 112 enables advancing, retreating, turning and spinning of the robot. Preferably, the first drive assembly 120 further includes a driven pulley 115 and a first cantilever 121, and the second drive assembly 130 further includes a driven pulley 115 and a second cantilever 131. Both the first cantilever 121 and the second cantilever 131 are arranged along a lengthwise direction of the chassis frame 110 (i.e., a direction parallel to the illustrated advancement direction X and retraction direction Y of the chassis frame 110). One end of the first cantilever 121 is coupled to the traveling drive unit 114, and the other end is coupled to the driven pulley 115. One end of the second cantilever 131 is coupled to the traveling drive unit 114, and the other end is coupled to the driven pulley 115. Both the first cantilever 121 and the second cantilever 131 are mounted on bearing seats 116 projecting from the chassis frame 110.

It would be appreciated that the number of traveling drive units 114 is not limited to two, and each of the drive assemblies may be provided therein with plurality of traveling drive units 114.

The cantilever assembly 140 is provided at the side of the chassis frame 110 oriented in the X direction (i.e., in a front end of the chassis frame 110) and includes a third cantilever 141 and two driven pulleys 115 coupled to opposite ends of the third cantilever 141. The third cantilever 141 is arranged along a widthwise direction of the chassis frame 110 (i.e., a direction perpendicular to the illustrated X-Y direction). The third cantilever 141 is mounted on the chassis frame 110 by a bearing seat 116. Preferably, the bearing seat 116 is located at the middle of the third cantilever 141. A center point of articulation of the first cantilever 121 and the bearing seat 116, a center point of articulation of the second cantilever 131 and the bearing seat 116 and a center point of articulation of the third cantilever 141 and the bearing seat 116 define a triangular articulating structure. As shown, the three center points form the vertices of the triangle 117. This triangular articulating structure imparts higher stability to the drive unit 1 and enables its stable movement. All the driven pulleys 115 may be selected as casters, or as wheels with swivel capabilities.

The standing plate 111 is fixed to the chassis frame 110 so as to project upward from the chassis frame 110. The cargo box storing unit 2 is mounted to the standing plate 111 and the chassis frame 110. The standing plate 111 is arranged along the widthwise direction of the chassis frame 110 between the cantilever assembly 110 and the drive assemblies 120, 130.

The sensor assembly is used to locate the drive unit 1 and identify obstacles. The sensor assembly includes an alignment sensor 151 mounted on the chassis frame 110 and laser modules 152 uniformly scattered across the periphery of the chassis frame 110. The alignment sensor 151 is used to locate the drive unit 1 and is preferably provided at a central position of the chassis frame 110. It can identify navigation marks (e.g., two-dimensional codes, guide stripes, etc.) provided on the ground. In this way, it can provide control over the direction and position of the robot during its traveling, enabling it to precisely reach a pickup location. It would be appreciated that the alignment sensor 151 may be, but is not limited to, a camera or sensor, and may be any device with locating and imaging functions. The laser modules 152 may be respectively provided at the front and rear ends of the chassis frame 110. Preferably, the laser modules 152 are arranged on a diagonal. In this way, their safe scanning coverage can encompass the whole robot, allowing them to identify obstacles around the robot and provide protection to the entire robot.

Figure 6:
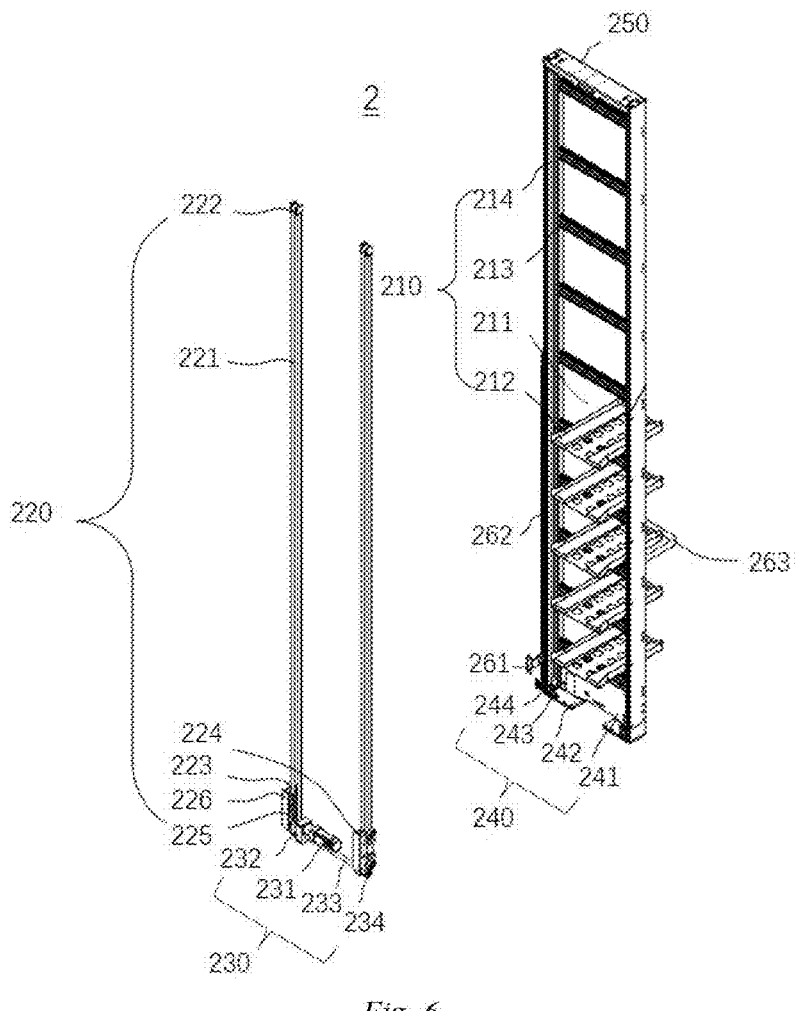
FIG. 6 is a diagram showing the structure of a cargo box storing unit in the robot of the third embodiment.

As shown in FIG. 6, the cargo box storing unit 2 is used to store cargo boxes 4 and drive the cargo box delivery unit 3 to move up and down the vertical direction. The cargo box storing unit 2 includes a gantry module 210, a lifting module 220, a lifting-drive module 230 and a gantry mounting module 240. The gantry module 210 is used to store cargo boxes 4 and configured with a plurality of cargo box storing spaces 211 arranged in a row in the vertical direction, each of which can be used to store a cargo box 4 therein. The gantry mounting module 240 is provided at the bottom of the gantry module 210 and mounted on the drive unit 1 so as to fix the cargo box storing unit 2 to the drive unit 1. The lifting module 220 is vertically oriented and coupled to the gantry module 210 on the side of the gantry module 210 directed toward/away from the robot's advancement direction (i.e., the X-Y direction). Preferably, there are two lifting modules 220, which are provided in symmetry at two widthwise sides of the gantry module 210. The lifting-drive module 230 is disposed at the bottom of the cargo box storing unit 2, coupled to the lifting module 220 and adapted to drive the lifting module 220 to move up and down in the vertical direction relative to the gantry module 210. The cargo box delivery unit 3 is coupled to the lifting module 220 so as to be movable therewith up and down in the vertical direction relative to the gantry module 210.

The gantry module 210 defines a plurality of cargo box storing spaces 211. Preferably, the gantry module 210 includes gantry shelf panels 212, gantry cross pieces 213 and gantry uprights 214. There may be at least one pair of gantry uprights 214, which are oriented vertically and disposed in opposition. The gantry cross pieces 213 are arranged in a vertical direction in a row between the pair of gantry uprights 214 (either equidistantly, or at intervals(s) between adjacent cross pieces 213 determined as needed). The gantry cross pieces 213 are coupled at opposing ends to the respective gantry uprights 214 disposed in opposition. The gantry shelf panels 212 are attached to the gantry cross pieces 213 and used to support cargo boxes 4. Preferably, gantry shelf panels 212 are provided with central partition spacers and peripheral thin plates for limiting cargo boxes. It would be appreciated that any other suitable structure capable of defining a plurality of cargo box storing spaces 211 can also be implemented as the gantry module 210 in this embodiment.

Figures 7, 8:
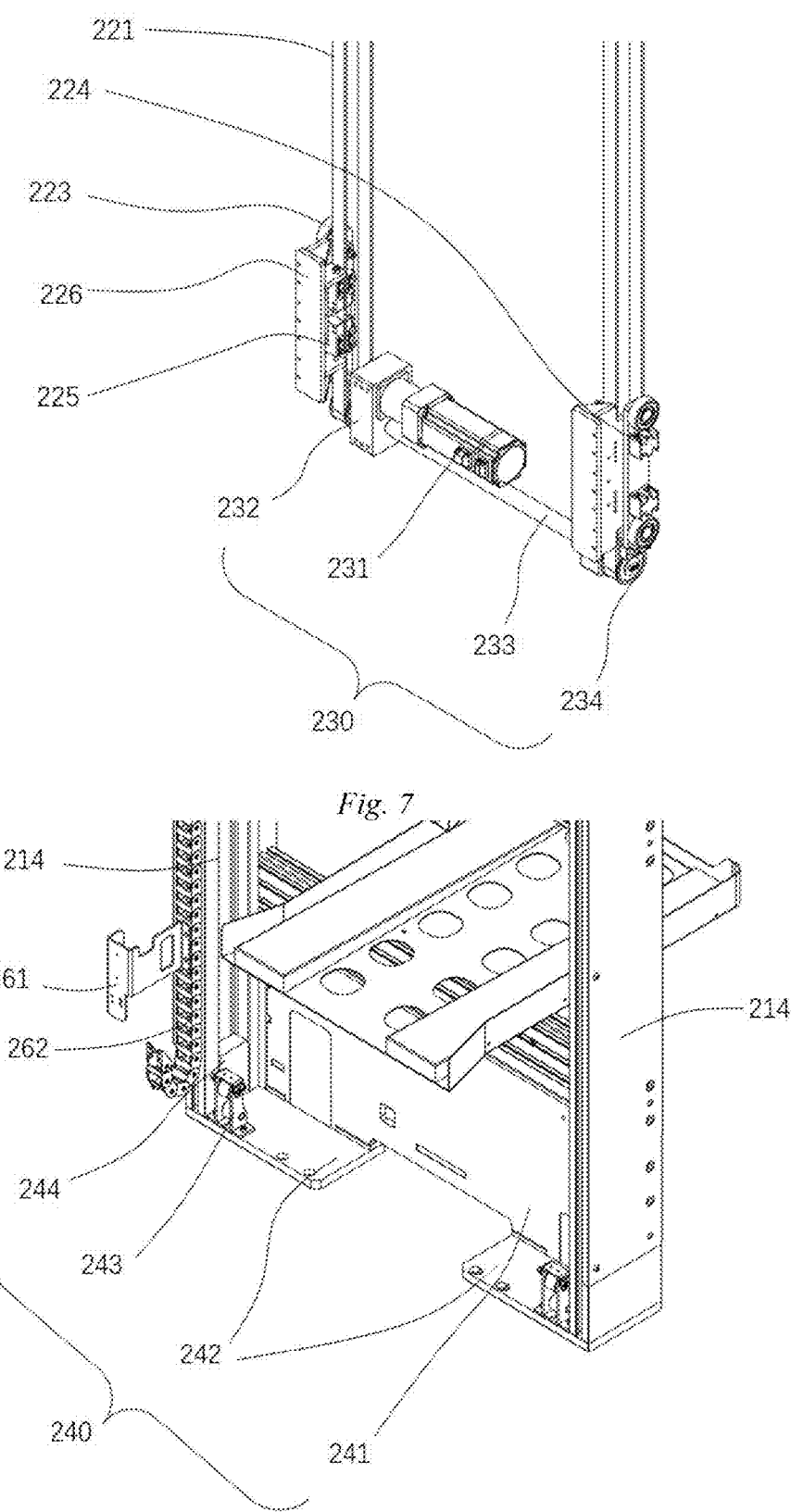
FIG. 7 is a diagram showing the structure of a lifting-drive module of the third embodiment.
FIG. 8 is a diagram showing the structure of a gantry mounting module of the third embodiment.

Referring to FIGS. 6 and 7, driven by external forces, the lifting module 220 can move up and down in the vertical direction relative to the gantry module 210. It includes a movable member and a transmission mechanism coupled to the movable member. The movable member is coupled to the cargo box delivery unit 3, and the transmission mechanism transmits external forces to the movable member to drive it to move up and down, causing the cargo box delivery unit 3 to move up and down. In a preferred embodiment, as shown in FIG. 7, transmission is provided by a timing belt in the lifting module 220. Specifically, the lifting module 220 includes a first timing belt 221, an idler pulley 222, guide wheels 223, side sliders 224, tensioners 225 and a lifting plate 226. Opposing ends of the first timing belt 221 are held between the tensioners 225. The first timing belt 221 and the tensioners 225 are disposed on an inner side of the lifting plate 226, while the guide wheels 223 and the side sliders 224 are mounted on an outer side of the lifting plate 226. Moreover, the two side sliders 224 are disposed between the two guide wheels 223. As a movable component, the lifting plate 226 is coupled to the cargo box delivery unit 3 and can thereby drive the cargo box delivery unit 3 to move up and down. The first timing belt 221 is arranged along a lengthwise direction of the gantry module 210. It is an endless belt wound at its top end around the idler pulley 222 which is fixed at the top of the gantry module 210. The first timing belt 221 is wound at the other end around an output component of the lifting-drive module 230. In this way, the first timing belt 221 forms a structure like a closed loop. The tensioners 225 are mounted to the lifting plate 226, used to tension the first timing belt 221 and movable with the lifting plate 226. The guide wheels 223 and the side sliders 224 are used to enable movement of the lifting module 220 along the direction of the gantry mounting module 240.

The lifting-drive module 230 is used to output power required to drive the lifting module 220 to move up and down. The lifting-drive module 230 includes a drive component 231, a transmission mechanism and an output component. The drive component 231 is coupled to the transmission mechanism, which is in turn coupled to the output component. The output component engages the first timing belt 221 of the lifting module 220 so that power can be output to the first timing belt 221. The drive component 231 may be selected as a motor, and the transmission mechanism includes a speed reducer 232 and a transmission shaft 233. The output component is selected as a drive pulley 234 provided at an end of the transmission shaft 233. The motor is coupled to the speed reducer 232 that is in engagement with the transmission shaft 233. Preferably, two drive pulleys 234 are provided at respective ends of the transmission shaft 233.

As shown in FIG. 8, the gantry mounting module 240 is used to secure the cargo box storing unit 2 to the drive unit 1 and includes a mounting plate 241 and a mounting baseplate 242. The mounting plate 241 is vertically oriented between the pair of gantry uprights 214 and may be fixedly mounted to the standing plate 111 in the drive unit 1. The mounting baseplate 242 is provided at the bottom of the gantry uprights 214 and of the mounting plate 241 and is horizontally oriented. The mounting baseplate 242 may be fixedly mounted on the chassis frame 110. Preferably, a pair of mounting baseplates 242 is provided at the bottom of the pair of respective gantry uprights 214. With the mounting plate 241 and the mounting baseplates 242, the cargo box storing unit 2 can be fixed in both the vertical direction and the traveling direction of the drive unit 1, improving stability of the cargo box storing unit 2. In some embodiments, components of the lifting-drive module 230 may be mounted on the mounting plate 241, such as the drive component 231, the speed reducer 232 and the transmission shaft 233.

In some embodiments, the gantry mounting module 240 is also provided thereon with a first anti-slippage means 242 and a lifting stopper 244. The lifting stopper 243 is mounted on the mounting baseplate 242 and used to define the lowest possible positions for the lifting plate 226 during its vertical movement, and the first anti-slippage means 243 is mounted on the mounting baseplate 242 on the slack side of the first timing belt 221 in order to press the first timing belt 221 firmly against the drive pulley 234 without slippage thereof.

Figure 9:
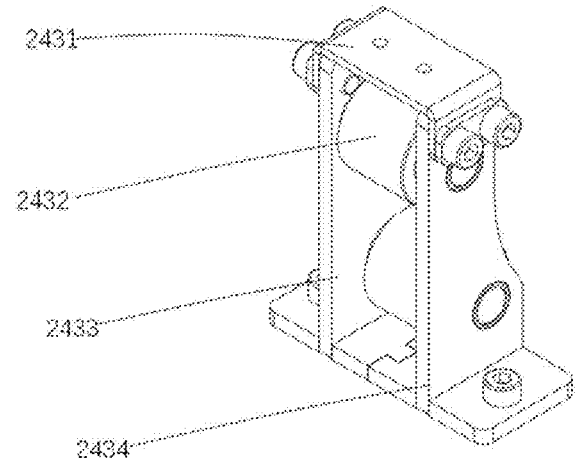
FIG. 9 is a diagram showing the structure of an anti-slippage means of the third embodiment.

As shown in FIG. 9, the first anti-slippage means 243 includes an upper press plate 2431, a tensioning wheel 2432, a left press plate 2433 and a right press plate 2434. The left press plate 2433 and the right press plate 2434 are upright plates placed in opposition to each other. The upper press plate 2431 is joined at its opposite ends respectively to the left press plate 2433 and the right press plate 2434 to form a frame. The tensioning wheel 2432 is disposed within the frame and rotatably coupled to the left press plate 2433 and the right press plate 2434. The tensioning wheel 2434 is brought into contact with the first timing belt 221, thereby firmly pressing it against the drive pulley 234.

Figure 10:
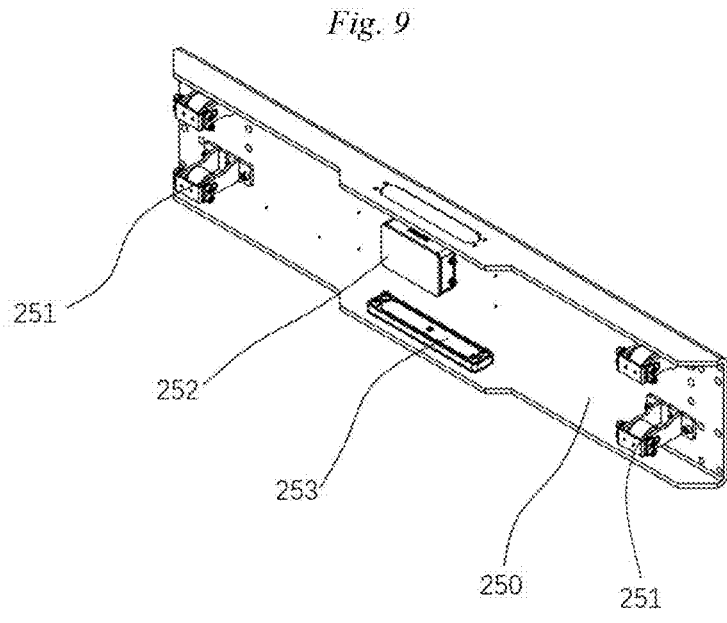
FIG. 10 is a diagram showing the structure of a gantry top plate in the cargo box storing unit of the third embodiment.

In some embodiments, as shown in FIGS. 6 and 10, the cargo box storing unit 2 further includes a gantry top plate 250. The gantry top plate 250 is mounted on the top of the gantry module 210, i.e., at the end of the gantry module 210 farther away from the gantry mounting module 240. The idler pulley 222 of the lifting module 220 may be secured to the gantry top plate 250. In some embodiments, second anti-slippage means 251 may be provided on the gantry top plate 250 on both sides of the idler pulley in order to press the first timing belt 221 firmly against the idler pulley 222. In the case of two lifting modules 220, there are two idler pulleys 222, which are mounted at two respective lengthwise ends of the gantry top plate 250 and are each provided on its both sides with respective second anti-slippage means 251. The second anti-slippage means 251 have the same structure as the first anti-slippage means 243 and, therefore, need not be described in further detail herein. In some embodiments, the gantry top plate 250 may be further provided thereon with a signal module 252 for enabling communications and a light strip 253 for providing a better lighting condition.

In some embodiments, as shown in FIGS. 6 and 8, the cargo box storing unit 2 further includes a drag chain mounting plate 261, a drag chain 262 and a grip 263. One end of the drag chain 262 is mounted to one gantry upright 214, and the other end of the drag chain 262 is mounted to the drag chain mounting plate 261. The drag chain mounting plate 261 is mounted to the cargo box delivery unit 3 so that the drag chain 262 can be curved and folded as the cargo box delivery unit 3 moves in the vertical direction of the gantry module 210. The grip 263 is mounted on surfaces of the gantry uprights 214 on the side thereof directed toward the X direction.

The cargo box delivery unit 3 can vertically move up and down under the drive of the lifting module 220 to reach a specified height of the shelf 40 and then return, thereby moving a cargo box 4 from the shelf 40 to the cargo box storing unit 2, or from the cargo box storing unit 2 to the shelf 40. The cargo box delivery unit 3 is coupled to, and hence moves with, the lifting plate 226 of the lifting module 220.

Figure 11:
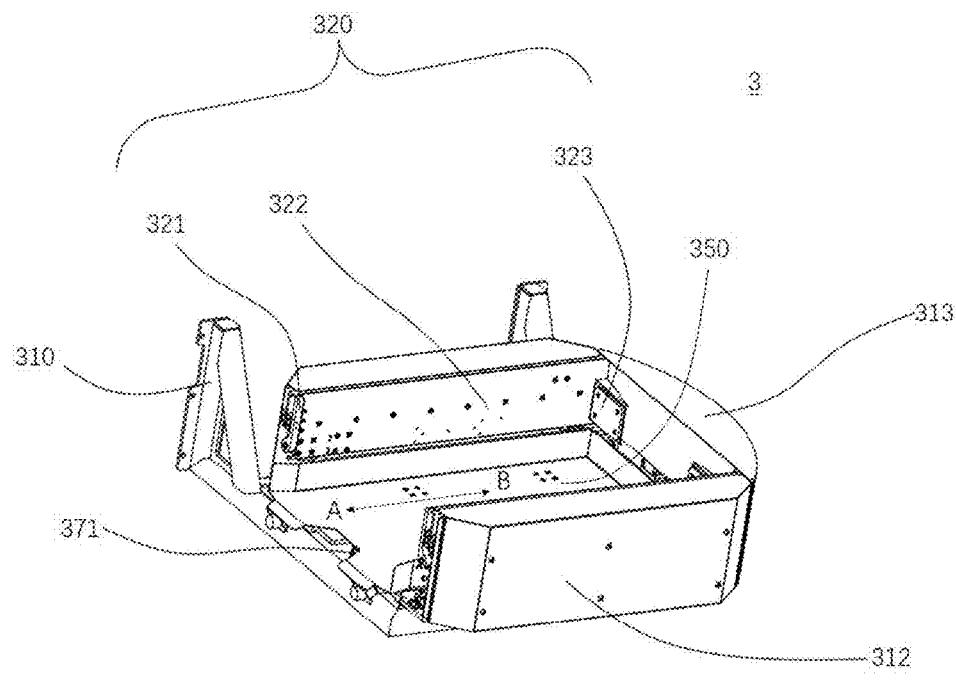
FIG. 11 is a diagram showing the structure of a cargo box delivery unit in the robot of the third embodiment.
Figure 12:
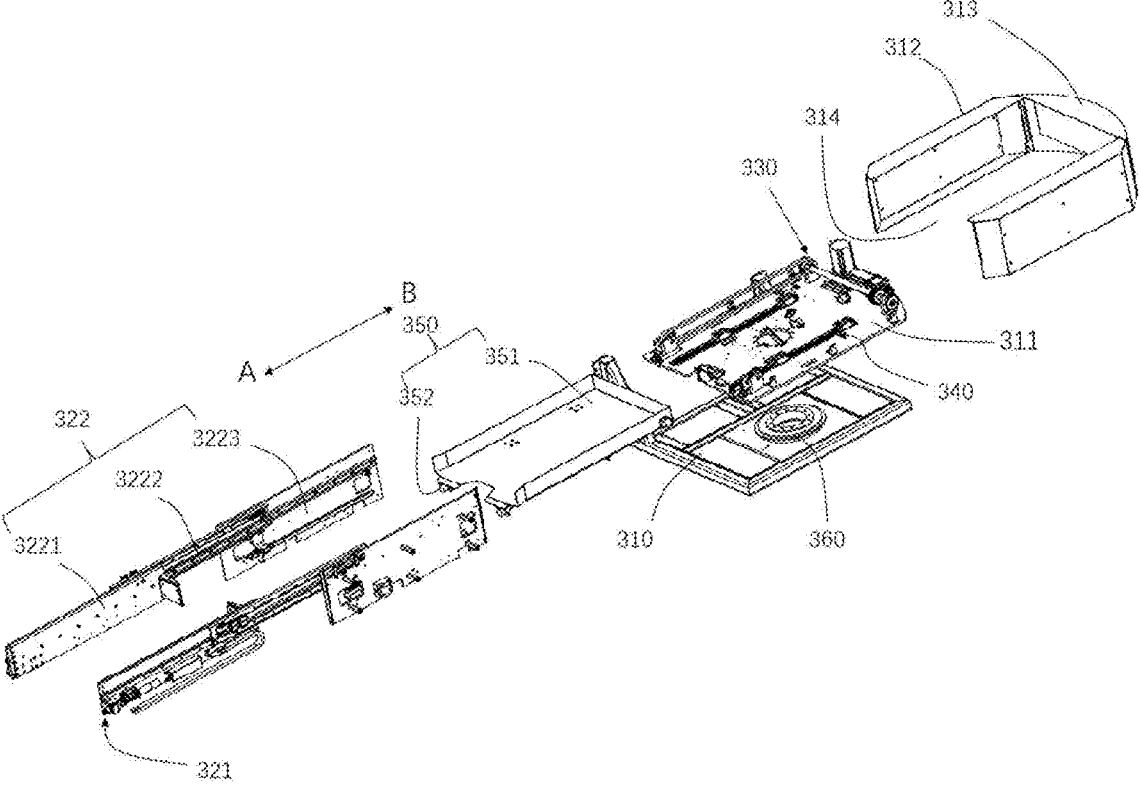
FIG. 12 is a schematic exploded view of FIG. 11.

As shown in FIGS. 11 and 12, the cargo box delivery unit 3 includes an underframe 310, hook-and-pull fork tooth modules 320, an extension-retraction drive module 330, an extension-retraction slide rail module 340, a follower mechanism 350, a rotational device 360, a sensor assembly and a baseplate 311. The baseplate 311 is arranged on the underframe 310, and the rotational device 360 is disposed at the center of the underframe 310 and can drive rotation of the baseplate 311. The hook-and-pull fork tooth modules 320, the extension-retraction drive module 330, the extension-retraction slide rail module 340, the follower mechanism 350 and the sensor assembly are all provided on the baseplate 311. The hook-and-pull fork tooth modules 320 are arranged at opposing sides of the baseplate 311 and configured to be able to telescope so as to extend beyond one end of the baseplate 311 and retract back. As shown, the direction of extension is denoted as A, and the direction of retraction as B. The hook-and-pull fork tooth modules 320 are provided at the sides of the baseplate 311 in parallel to the A-B direction and configured to extend in the A-B direction out of the baseplate 311 from one end thereof. Here, the end of the baseplate 311 where the hook-and-pull fork tooth modules 320 extend out of the baseplate 311 is referred to as a front end (i.e., its end directed toward the A direction), while its end opposite to the front end is referred to as a rear end (i.e., the end directed toward the B direction). The extension-retraction drive module 330, the extension-retraction slide rail module 340 and the follower mechanism 350 are provided on the baseplate 311. The extension-retraction drive module 330 is coupled to the hook-and-pull fork tooth modules 320 so as to be able to drive the hook-and-pull fork tooth modules 320 to telescope in the A-B direction. The follower mechanism 350 is coupled to the hook-and-pull fork tooth modules 320 so as to be able to move together with the hook-and-pull fork tooth modules 320. The extension-retraction slide rail module 340 is coupled to the follower mechanism 350 so as to allow it to move on the extension-retraction slide rail module 340. A cargo box 4 may be placed on the follower mechanism 350 so as to be able to move with the follower mechanism 350 between the cargo box delivery unit 3 and the shelf 40. The rotational device 360 can rotate the baseplate 311 to orient the hook-and-pull fork tooth modules 320 at a specified angle.

Figure 13:
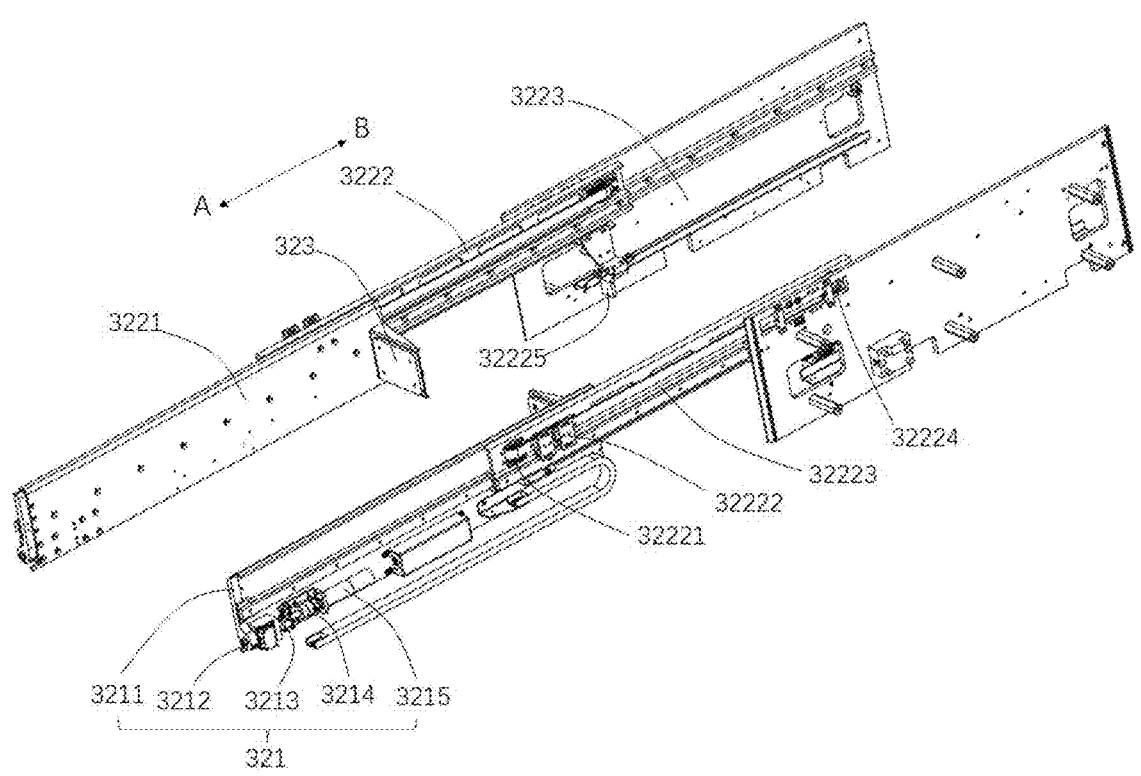
FIG. 13 is a schematic illustration of telescopic fork tooth devices of the third embodiment in an extended configuration.

As shown in FIGS. 12 and 13, the hook-and-pull fork tooth modules 320 can extend from or retract back to the cargo box delivery unit 3. In this process, a cargo box 4 carried on the hook-and-pull fork tooth modules 320 can move with it, either from the shelf 40 to the cargo box delivery unit 3, or from the cargo box delivery unit 3 to the shelf 40. The hook-and-pull fork tooth modules 320 can perform similar operations with the cargo box storing unit 2 for transferring a cargo box 4. Moving a cargo box 4 with the hook-and-pull fork tooth modules 320 on which it is carried enables the cargo box 4 to transfer between the cargo box storing unit 2 and the shelf 40. By "the hook-and-pull fork tooth modules 320 are provided at the opposing sides of the baseplate 311 in parallel to the A-B direction", it is intended to mean that each single one of the hook-and-pull fork tooth modules 320 is provided at a respective one of opposite sides of the baseplate 311. The two hook-and-pull fork tooth modules 320 are of the same structure. Each hook-and-pull fork tooth module 320 includes a swinging rod device 321, a telescopic fork tooth device 322 and a push plate 323.

The telescopic fork tooth device 322 includes an inner fork tooth 3221, an intermediate fork tooth 3222 and an outer fork tooth 3223. The outer fork tooth 3223 is fixed to the baseplate 311 (to serve as a fixed fork tooth. The intermediate fork tooth 3222 is mounted to an inner side of the outer fork tooth 3223, and the inner fork tooth 3221 is mounted to an inner side of the intermediate fork tooth 3222. The swinging rod device 321 is mounted to an outer side of the inner fork tooth 3221 at an end thereof directed toward the A direction, and the push plate 323 is mounted to an inner side of the inner fork tooth 3221 at an end thereof directed toward the B direction. The intermediate fork tooth 3222 and the inner fork tooth 3221 can move forth and back in the A-B direction to transfer a cargo box 4 between the shelf 40 and the follower mechanism 350. The intermediate fork tooth 3222 is provided with a first timing pulley 32221, a tensioning means 32222, a second timing belt 32223 and a second timing pulley 32224. The first timing pulley 32221 and the second timing pulley 32224 are provided at opposite ends of the intermediate fork tooth 3222 opposing each other along the telescoping direction (i.e., the A-B direction). The second timing belt 32223 is wound into an open ring, with its both ends being affixed to the tensioning means 32222, which is in turn secured at the side of the intermediate fork tooth 3222 directed toward the inner fork tooth 3221. A center line of the second timing belt 32223 is aligned at its both ends with the centers of the first timing pulley 32221 and the second timing pulley 32224. This enables the second timing belt 32223 to move with the fork teeth. When the intermediate fork tooth 3222 moves under the drive of the extension-retraction drive module 330, the inner fork tooth 3221 will move together with the intermediate fork tooth 3222. As a result, the intermediate fork tooth 3222 and the inner fork tooth 3221 extend outwardly as a whole. Preferably, the movement of the intermediate fork tooth 3222 occurs at an initial speed V1, and the movement of the inner fork tooth 3221 occurs at a speed V2. Here, the speed of the inner fork tooth 3221 refers to a speed at which it moves forth and back and is twice the initial speed V1. The second timing belt 32223 is wound over the first timing pulley 32223 and the second timing pulley 32224 and attached to an end of the outer fork tooth 3223 directed toward the A direction and an end of the inner fork tooth 3221 directed toward the B direction. When the intermediate fork tooth 3222 is driven to move, the first timing pulley 32223 and the second timing pulley 32224 will be rotated by the second timing belt 32223, causing consequent movement of the inner fork tooth 3221 (at this time, the inner fork tooth 3221, the intermediate fork tooth 3222 and the outer fork tooth 3223 behave like a movable pulley system, in which the outer fork tooth 3223 function as a fixed pulley, the intermediate fork tooth 3222 as a movable pully and the inner fork tooth 3221 as an object being moved, and V2 is 2 times V1). The intermediate fork tooth 3222 is provided thereon with an L-shaped stop tab 32225 which is adapted to, during retraction of the fork teeth, abut against a front end of the follower mechanism 350 and pull the follower mechanism 350 back. In this embodiment, the telescopic fork tooth device 322 has two telescopic strokes. The intermediate fork tooth 3222, when extended, provides a first telescopic stroke, and the inner fork tooth 3221, when extended, provides a second telescopic stroke.

As shown in FIG. 13, the swinging rod device 321 is provided on the fork tooth corresponding to the last one of the telescopic strokes. In this embodiment, since the inner fork tooth 3221 is the fork tooth that the second telescopic stroke corresponds to, the swinging rod device 321 is provided on the inner fork tooth 3221. The swinging rod device 321 includes a swinging rod 3211, a path detection sensor 3212, a swinging rod stopper 3213, a coupling 3214 and a swinging rod motor 3215. The swinging rod devices 321 are mounted at the respective outer sides of the two inner fork teeth 3221 (i.e., the sides thereof directed toward the respective intermediate fork teeth 3222) and at the respective ends thereof away from the respective push plates 323 (i.e., the respective ends thereof directed toward the A direction). The swinging rod 3211 is able to pivot with respect to the telescoping direction of the fork teeth, and when the swinging rod 3211 becomes parallel to the follower mechanism 350, it is considered as being in a deployed configuration. At this time, the swinging rod 3211 is oriented at an angle relative to the inner fork tooth 3221. Preferably, the angle is a right angle, i.e., the swinging rod 3211 is perpendicular to the inner fork tooth 3221. When it is oriented in parallel to a widthwise direction of the inner fork tooth 3221 (perpendicular to the A-B direction), it is considered as being in a withdrawn configuration. When in this configuration, the swinging rod 3211 moves from a proximal end of a cargo box 4 placed on the shelf 40 to a distal end thereof, and then pivots into the deployed configuration in which it forms the angle with the inner fork tooth 3221. Thus, when the inner fork tooth 3221 is retracted, the swinging rod 3211 will come into contact with the cargo box 4 and push it into the cargo box delivery unit 3 as a result of the retraction of the telescopic fork tooth device 322. The swinging rod 3211 is coupled to the coupling 3214 through a swinging rod axle, and the stopper 3213 is mounted between the swinging rod 3211 and the coupling 3214. The sensors 3212 are mounted on opposing sides of the coupling 3214 and coupled to the swinging rod motor 3215 by the coupling 3214. When positioned at an initial position, the swinging rod 3211 is flush with the inner fork tooth 3221. When the swinging rod 3211 is driven by the swinging rod motor 3215 to pivot counterclockwise into perpendicularity to the inner fork tooth 3221, the stopper 3213 will trigger the sensors 3212 to stop the swinging rod device 321; and vice versa. In order to pull a cargo box 4 on the shelf 40 into the cargo box delivery unit 3, the cargo box delivery unit 3 moves to a predetermined position and rotates to a predetermined orientation, and the swinging rods 3211 are maintained in their initial positions. The intermediate fork teeth 3222 are driven to move, causing the inner fork teeth 3221 and the swinging rod devices 321 to move responsively toward the cargo box 4 to their respective target positions. The two swinging rods 3211 then pivot inwardly into perpendicularity to the inner fork teeth 3221 so that the swinging rods 3211, the inner fork teeth 3221 and the push plates 323 together resemble a closed loop. Thus, when the intermediate fork teeth 3222 are retracted, the cargo box 4 can be pulled into the cargo box delivery unit 3. In order to transfer a cargo box 4 from the cargo box delivery unit 3 into the shelf 40, the swinging rods 3211 inwardly pivot from their initial positions into perpendicularity to the inner fork teeth 3221 so that the swinging rods 3211, the inner fork teeth 3221 and the push plates 323 together resemble a closed loop. Thus, when the intermediate fork teeth 3222 are advanced toward the shelf 40, the cargo box can be moved from the cargo box delivery unit 3 to a target position on the shelf 40. After that, the swinging rods 3211 pivot into their initial positions, and the inner fork teeth 3221, the intermediate fork teeth 3222 and the swinging rod devices 321 then return to their respective initial positions.

Figure 14:
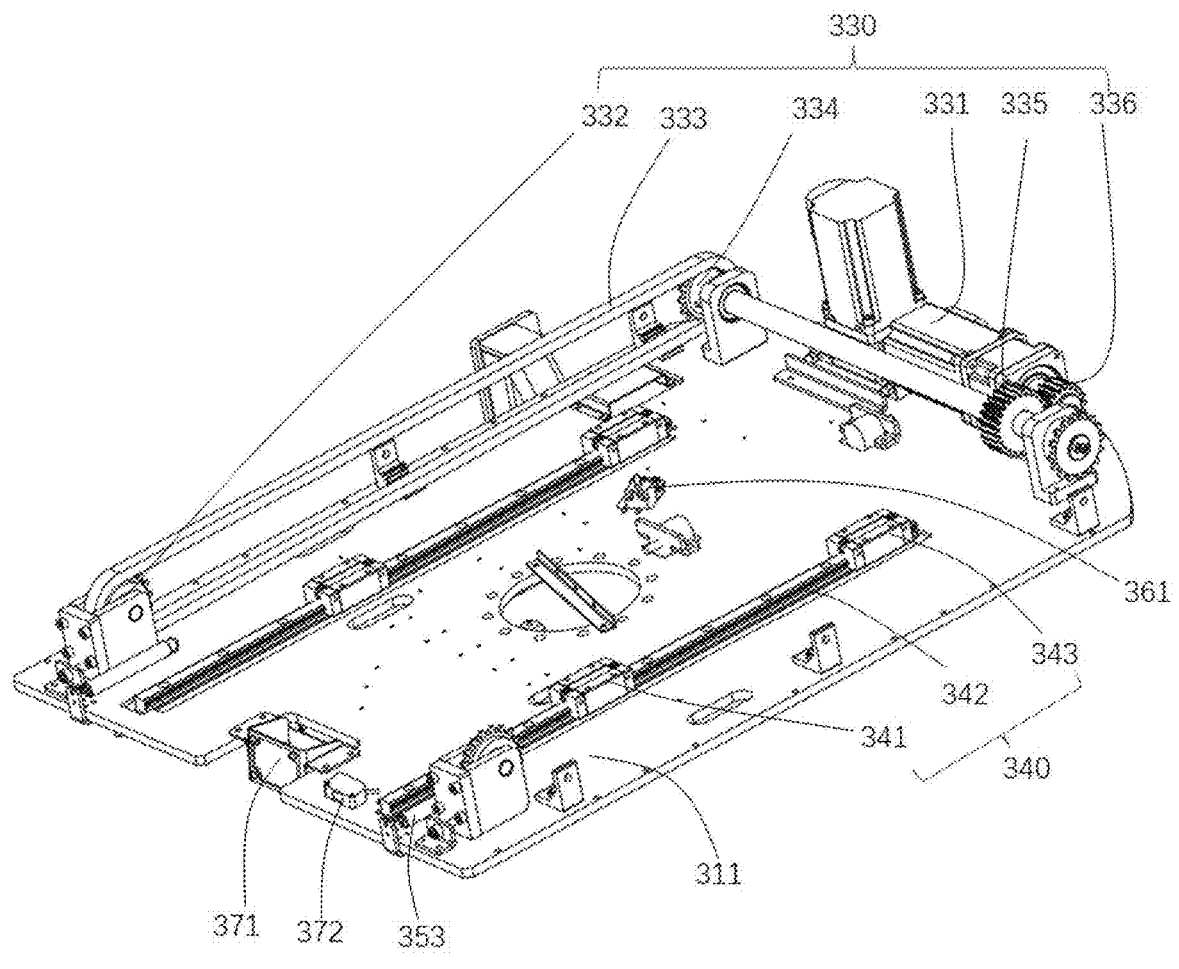
FIG. 14 is a schematic diagram showing the structure of an extension-retraction drive module and extension-retraction slide rail modules of the third embodiment.

The extension-retraction drive module 330 is mounted on the baseplate 311. Specifically, as shown in FIG. 14, the extension-retraction drive module 330 includes a drive component 331 and transmission mechanisms. The drive component 331 outputs power, which is transmitted to the telescopic fork tooth devices 322 by the transmission mechanisms, thereby driving the telescopic fork tooth devices 322 to telescope. In some embodiments, the drive component 331 is selected as a motor, and the transmission mechanisms are selected as chain transmission mechanisms. There are one motor and two transmission mechanisms. The transmission mechanisms are both coupled to a transmission shaft and provided at opposite ends of the transmission shaft. The transmission shaft is coupled to the motor. The two transmission mechanisms are provided at the opposite sides of the baseplate 311 in parallel to the A-B direction, i.e., the sides where the respective outer fork teeth 3223 are provided. The two transmission mechanisms are of the same structure. The transmission mechanisms include first transmission sprockets 332, chains 333, second transmission sprockets 334, an intermediate transmission gear 335 and a main drive gear 336. The first transmission sprockets 332 are provided on the front end of the baseplate 311, whilst the second transmission sprockets 334, the main drive gear 336, the intermediate transmission gear 335 and the motor are all provide at the rear end of the baseplate 311. The chains 333 are trained over the first transmission sprockets 332 and the second transmission sprockets 334 in the form of endless loops. The main drive gear 336 is mounted on an output shaft of the drive component 331, and the intermediate transmission gear 335 meshes with the main drive gear 336. The second power transmission sprockets 334 are mounted to the opposite ends of the transmission shaft, and the intermediate transmission gear 335 is mounted between the two second transmission sprockets 334. The drive component 331 drives the main drive gear 336 to move, causing the two first transmission sprockets 334 and hence the respective chains 333 to move therewith.

Referring to FIG. 12, the follower mechanism 350 is adapted to carry a cargo box 4 and move together with the telescopic fork tooth devices 322. The follower mechanism 350 includes a plate-shaped member 351 for carrying a cargo box 4. During extension of the telescopic fork tooth devices 322, the plate-shaped member 351 moves therewith and comes into abutment with the shelf 40. Preferably, the plate-shaped member 351 is provided with rubber pads 352 at its end directed toward the shelf 40. Upon the plate-shaped member 351 coming into abutment with the shelf, the rubber pads 352 are located between the plate-shaped member 351 and the shelf and provide a buffering effect. That is, the rubber pads 352 are in contact with a panel of the shelf 40. Springs 353 are connected between the end of the follower mechanism 350 directed away from the direction of extension and the rear end of the baseplate 311. During extension of the telescopic fork tooth devices 322, the follower mechanism 350 is biased by the springs 353 to advance with the telescopic fork tooth devices 322. During retraction of the telescopic fork tooth devices 322, the L-shaped stop tabs 32225 on the intermediate fork teeth 3222 move with the rubber pads 352 on the follower mechanism 350.

Referring to FIG. 14, the extension-retraction slide rail module 340 is mounted on the baseplate 311. The extension-retraction slide rail module 340 is used to carry the follower mechanism 350 and allow it to move on the extension-retraction slide rail module 340. Either one or more extension-retraction slide rail modules 340 may be provided. Preferably, as shown, two extension-retraction slide rail modules 340 of the same structure are provided at the opposite sides of the baseplate 311. In some embodiments, each extension-retraction slide rail module 340 includes a first slider 341, a slide rail 342 and a second slider 343. The first slider 341 and the second slider 343 are able to slide freely on the slide rail 342. The follower mechanism 350 is mounted on the first sliders 341 and the second sliders 343. Preferably, in order to store a cargo box 4, the cargo box 4 is placed on the surface of the follower mechanism 350. As a result of the telescopic fork tooth devices 322 being extended, the follower mechanism 350 moves with the telescopic fork tooth devices 322 on the extension-retraction slide rail modules 340. Upon the rubber pads 352 coming into contact with an intended panel of the shelf 40, the cargo box 4 is pushed into the panel by the push plate 323. In this way, a higher rate of success in storing the cargo box 4 can be achieved.

During storage of a cargo box 4 accomplished by the swinging rod devices 321 and the push plates 323 in the hook-and-pull fork tooth modules 320, the cargo box 4 is positioned and moved in a closed loop made up of the inner fork teeth 3221, the intermediate fork teeth 3222, the outer fork teeth 3223, the swinging rod devices 321 and the push plates 323.

The rotational device 360 is mounted at the center of the underframe 310 and can drive rotation of the baseplate 311 and hence the hook-and-pull fork tooth modules 320 mounted on the baseplate so that an opening defined by the hook-and-pull fork tooth modules 320 is directed toward a cargo box. Beside the rotational device 360, there is provided a rotation stop sensor 361 for detecting an angular orientation of the baseplate that is being rotated by the rotational device 360.

As shown in FIGS. 11 and 14, sensors arranged on the cargo box delivery unit 3 include, disposed at the front end of the underframe 310, a pose sensor 371 and a cargo box detection sensor 372 capable of detecting a cargo box 4 and a distance between the cargo box delivery unit 3 and the cargo box 4. The sensors may be selected as vision sensors or other sensors capable of detecting pose information.

In some embodiments, as shown in FIG. 11, the cargo box delivery unit 3 further includes covers which are fixed on the outside of the baseplate and cover the hook-and-pull fork tooth modules 320, providing protection to the hook-and-pull fork tooth modules 320. The covers include a rear over 313 and side covers 312. The rear over 313 is fixed at the rear end of the baseplate 311. There are two side covers 312, which are provided at the opposite sides of the baseplate 311 in parallel to the A-B direction on the outer sides of the outer fork teeth 3223. The rear over 313 is connected at its opposite ends to the two side covers 312, while an opening 314 (see FIG. 12) is defined at the side opposite to the rear over 313, i.e., the front end of the baseplate 311. The hook-and-pull fork tooth modules 320 can telescope from the opening 314.

Figures 15, 16:
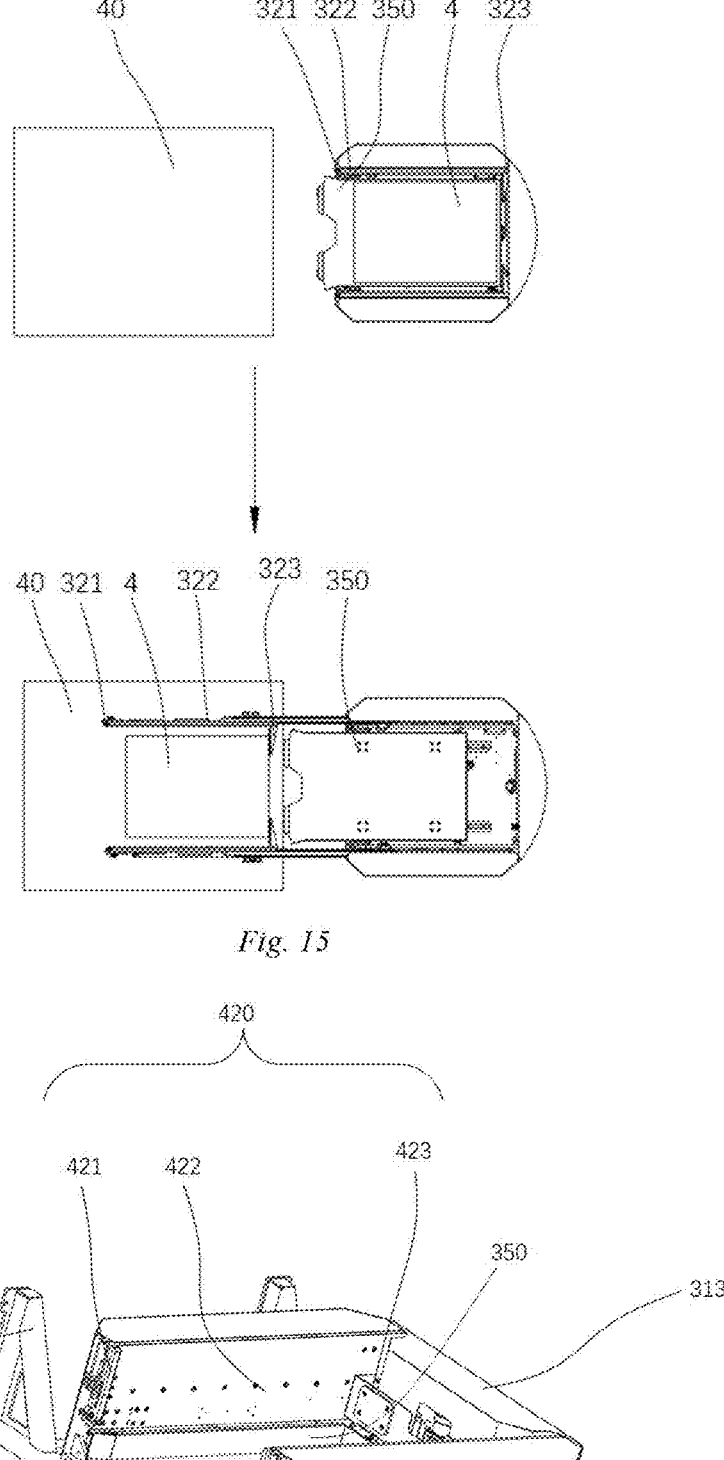
FIG. 15 schematically illustrates a process of transferring a cargo box using the robot of the third embodiment.
FIG. 16 is a diagram showing the structure of a cargo box delivery unit in a robot according to a fourth embodiment.

As shown in FIG. 15, a process of transferring a cargo box 4 from the cargo box storing unit 2 to the shelf 40 using the robot of this embodiment is described below.

The robot is driven by the drive unit 1 to travel on the ground from an initial position to a specified position.

The cargo box delivery unit 3 moves to a specified height of the cargo box storing unit 2, and the rotational device 360 rotates the telescopic fork tooth devices 322 to a specified angular position so that the opening 314 defined by the hook-and-pull fork tooth modules 320 is directed toward the cargo box 4 stored on the cargo box storing unit 2.

The telescopic fork tooth devices 322 in the hook-and-pull fork tooth modules 320 extend and pass on opposite sides of the cargo box 4, and the swinging rods 3211 in the swinging rod devices 321 pivot into parallelism with the follower mechanism 350. At this time, the telescopic fork tooth devices 322 start retracting, causing the swinging rods 3211 to retract and move the cargo box 4 therewith. When the telescopic fork tooth devices 322 return to their rest positions, the cargo box 4 is brought onto the follower mechanism 350, and the swinging rods 3211 return to their initial positions.

The cargo box delivery unit 3 again moves to the specified height of the shelf 40, and the rotational device 360 rotates the telescopic fork tooth devices 322 to the specified angular position, directing the opening 314 defined by the hook-and-pull fork tooth modules 320 toward the shelf 40.

The telescopic fork tooth devices 322 extend onto the shelf 40, and the follower mechanism 350 moves therewith.

Upon the follower mechanism 350 coming into abutment with the shelf 40, the push plates 323 push the cargo box 4 from the follower mechanism 350 onto the shelf 40. At last, the telescopic fork tooth devices 322 retract, thereby completing the process.

EXAMPLE 4

FIGS. 16 to 19 show a fourth embodiment.

This embodiment is substantially similar to the third embodiment, i.e., including the same drive unit 1 and cargo box storing unit 2, except that the cargo box delivery unit of this embodiment has an additional stage of telescopic mechanisms compared to that of the third embodiment. That is to say, the cargo box delivery unit of this embodiment has the same underframe 310, extension-retraction drive module 330, extension-retraction slide rail modules 340, follower mechanism 350, rotational device 360, sensors, baseplate 311 and covers 312, 313 as that of the third embodiment, except that the hook-and-pull fork tooth modules 420 of this embodiment have one added telescopic stage. The underframe 310, extension-retraction drive module 330, extension-retraction slide rail modules 340, follower mechanism 350, rotational device 360, sensors, baseplate 311 and covers 312, 313 that are the same as those of the third embodiment will not be described again in this embodiment.

Figure 17:
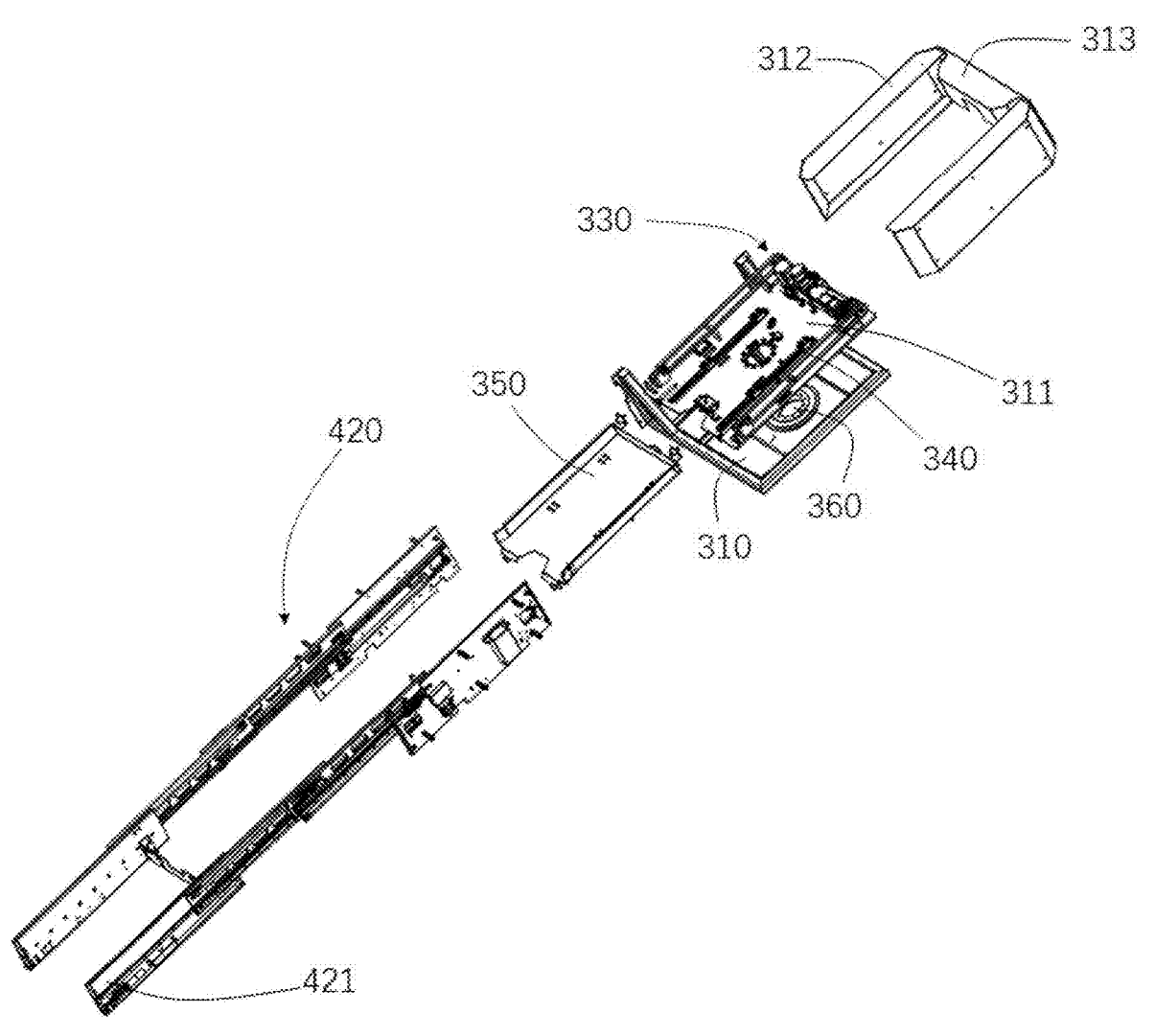
FIG. 17 is a schematic exploded view of FIG. 16.
Figure 18:
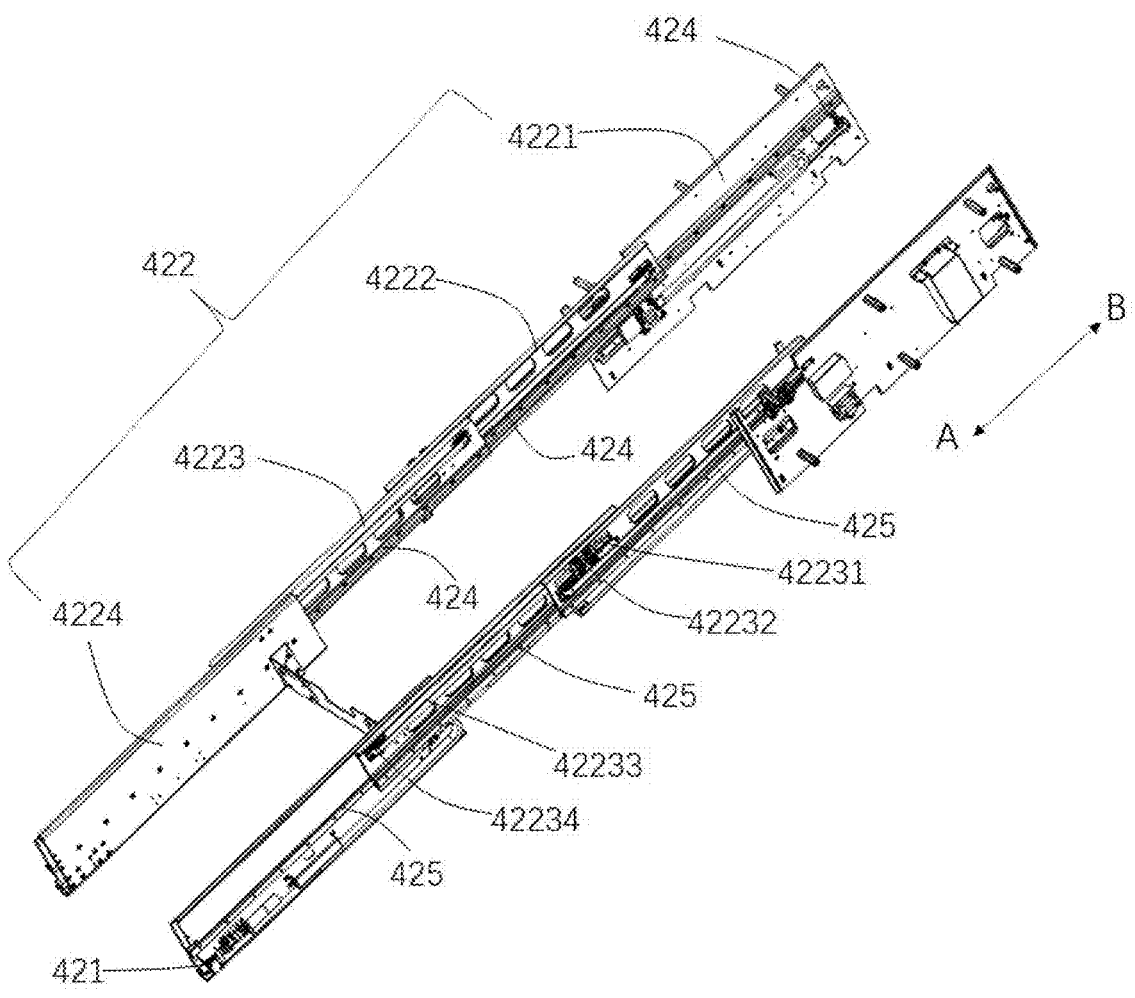
FIG. 18 is a schematic illustration of telescopic fork tooth devices of the fourth embodiment in an extended configuration.

As shown in FIGS. 16, 17 and 18, in this embodiment, double-telescoping hook-and-pull fork tooth modules 420 are provided at opposite sides of the baseplate 311 in parallel to the A-B direction. That is, each double-telescoping hook-and-pull fork tooth module 420 is provided at one of the two sides of the baseplate 311. The two double-telescoping hook-and-pull fork tooth modules 420 are of the same structure. Compared to the hook-and-pull fork tooth modules 320 of the third embodiment, those of this embodiment have one added telescopic stage. The hook-and-pull fork tooth modules 320 of the third embodiment have two telescopic strokes provided respectively by the intermediate and inner fork teeth. In contrast, the double-telescoping hook-and-pull fork tooth modules 420 of this embodiment have three telescopic strokes.

Referring to FIGS. 17 and 18, each double-telescoping hook-and-pull fork tooth module 420 includes a double-telescoping swinging rod device 421, a double-telescoping telescopic fork tooth device 422 and a push plate 423. The double-telescoping fork tooth device 422 includes a fixed fork tooth 4221, a first fork tooth 4222, a second fork tooth 4223 and a third fork tooth 4224. The fixed fork teeth 4221 are fixed at the opposite sides of the baseplate 311 along the A-B direction. The first fork tooth 4222 is mounted to an inner side of the fixed fork tooth 4221, and the second fork tooth 4223 is mounted to an inner side of the first fork tooth 4222. The third fork tooth 4224 is mounted to an inner side of the second fork tooth 4223, and the double-telescoping swinging rod device 421 is mounted to an outer side of the third fork tooth 4224 at an end thereof proximal to the front end of the baseplate 311 (i.e., the end of the third fork tooth 4224 directed toward the A direction). The push plate 423 is mounted to an inner side of the first fork tooth 4222 at an end thereof distal from the front end of the baseplate 311 (i.e., the end of the first fork tooth 4222 directed toward the B direction). The first fork tooth 4222, the second fork tooth 4223 and the third fork tooth 4224 can move forth and back in the A-B direction to transfer a cargo box 4 between a panel of a shelf 40 and the follower mechanism 350. Each of the first fork tooth 4222 and the second fork tooth 4223 includes a third timing pulley 42231, a tensioning means 42232, a third timing belt 42233 and a fourth timing pulley 42234. The third timing pulleys 42231 and the fourth timing pulleys 42234 are provided at opposite ends of the first fork tooth 4222 and the second fork tooth 4223. The tensioning means 42232 are mounted to both the fixed fork tooth 4221 and the first fork tooth 4222. The third timing belt 42233 is wound into an open ring, with its both ends being affixed to the tensioning means 42232. The timing belt 42233 is wound over the timing pulleys at the opposite ends of the first fork tooth 4222 and attached at one end to the fixed fork tooth 4221 and at the other end to the second fork tooth 4223. The tensioning means 42232 is coupled to opposite ends of the timing belt 42233 and mounted to the fixed fork tooth 4221. Again, the timing belt 42233 is wound over the timing pulleys at the opposite ends of the second fork tooth 4223 and attached at one end to the first fork tooth 4222 and at the other end to the third fork tooth 4224. The tensioning means 42232 is coupled to the opposite ends of the timing belt 42233 and mounted to the first fork tooth 4222. The tensioning means 42232 are fixed respectively at a middle location between the fixed fork tooth 4221 and the first fork tooth 4222 and at a middle location between the first fork tooth 4222 and the second fork tooth 4223. Center lines of the third timing belts 42233 are aligned at both ends with the centers of the timing pulleys, enabling the third timing belts 42233 to move with the fork teeth. When the first fork teeth 4222 are driven by the extension-retraction drive module 330 to move at an initial speed V1, the second fork teeth 4223 move with the movement of the first fork teeth 4222 at a speed V2, and it is configured that the speed V2 at which the second fork teeth 4223 move forth and back is twice the initial speed V1. The third fork teeth 4224 move with the movement of the second fork teeth 4223 at a speed V3, and it is configured that the speed V3 at which the third fork teeth 4224 move forth and back is thrice the initial speed V1. The double-telescoping telescopic fork tooth devices 422 of this embodiment have three telescopic strokes. The first fork teeth 4221 when extended provide a first telescopic stroke, the second fork teeth 4222 when extended provide a second telescopic stroke, and the third fork teeth 4223 when extended provide a third telescopic stroke.

The fixed fork teeth 4221 are provided on their inner sides with slide rail grooves 424 extending in the A-B direction, and the first fork teeth are provided on their outer sides with slide rails 425 extending in the A-B direction. The first fork teeth are provided on their inner sides with slide rail grooves 424 extending in the A-B direction, and the second fork teeth are provided on their outer sides with slide rails 425 extending in the A-B direction. The second fork teeth are provided on their inner sides with slide rail grooves 424 extending in the A-B direction, and the third fork teeth are provided on their outer sides with slide rails 425 extending in the A-B direction. The slide rail grooves 424 and the slide rails 425 are provided at the same height.

The double-telescoping swinging rod devices 421 are mounted to the third fork teeth 4223 corresponding to the last one of the telescopic stroke (i.e., the third telescopic stroke). The double-telescoping swinging rod devices 421 are structured and operate in the same manner as the swinging rod devices 321 of the third embodiment and, therefore, need not be described in further detail herein.

Compared to the third embodiment, as a sensor, a laser module for detecting a cargo box 4 may be further provided.

A process of transferring a cargo box to the cargo box storing unit using the robot of this embodiment is described below.

Figure 19:
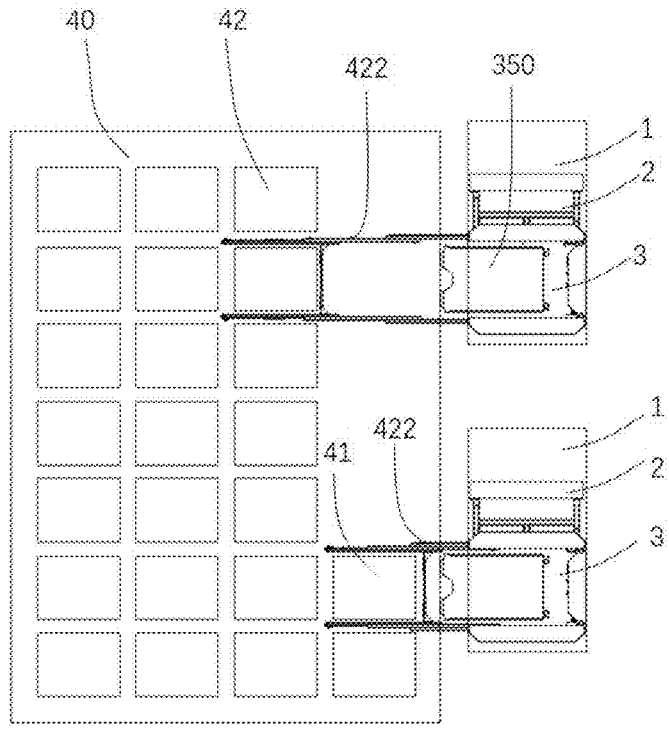
FIG. 19 schematically illustrates a process of transferring a cargo box using the robot of the fourth embodiment.
Figure 20:
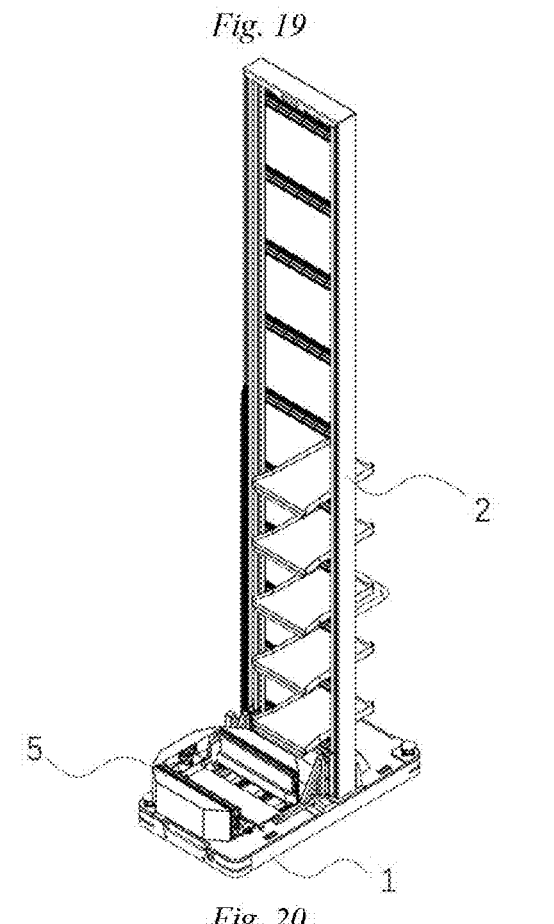
FIG. 20 is a diagram showing the structure of a robot according to a fifth embodiment.

As shown in FIG. 19, a cargo box 4 may be placed at either of the following two positions of the shelf 40: a first position 41 closer to the cargo box delivery unit 3 and a second position 42 farther away from the cargo box delivery unit 3. The robot is driven by the drive unit 1 to travel on the ground from an initial position to a specified position, and a cargo box delivery unit 3 is moved to a specified height by the lifting module 220 of the cargo box storing unit 2. After the rotational device 360 of the cargo box delivery unit 3 rotates the double-telescoping telescopic fork tooth devices 422 to a specified angular position, the robot fetches a cargo box 4 from a panel placed at the first position 41 of the shelf 40 through extending and retracting the double-telescoping telescopic fork tooth devices 422. Subsequently, the cargo box 4 retained on the double-telescoping hook-and-pull fork tooth modules 420 is lifted or lowered by the lifting module 220 of the cargo box storing unit 2 to a specified height, and both the double-telescoping hook-and-pull fork tooth modules 420 and the cargo box 4 are rotated to another specified angular position by the rotational device 360 of the cargo box delivery unit 3. After that, the double-telescoping hook-and-pull fork tooth modules 420 put the cargo box 4 onto a panel 212 of the cargo box storing unit 2. Finally, the double-telescoping hook-and-pull fork tooth modules 420 are retracted, accomplishing transfer and storage of the cargo box from the first position 41.

The robot moves the cargo box delivery unit 3 to a specified height using the lifting module 220 of the cargo box storing unit 2 and rotates the double-telescoping telescopic fork tooth devices 422 to a specified angular position using the rotational device 360 of the cargo box delivery unit 3. It then fetches a cargo box 4 from a panel placed at the second position 42 of the shelf 40 through extending and retracting the double-telescoping telescopic fork tooth devices 422. Subsequently, the cargo box 4 retained on the double-telescoping hook-and-pull fork tooth modules 420 is lifted or lowered by the lifting module 220 of the cargo box storing unit 2 to a specified height, and both the double-telescoping hook-and-pull fork tooth modules 420 and the cargo box 4 are rotated to another specified angular position by the rotational device 360 of the cargo box delivery unit 3. After that, the double-telescoping hook-and-pull fork tooth modules 420 put the cargo box 4 onto a panel 212 of the cargo box storing unit 2. Finally, the double-telescoping hook-and-pull fork tooth modules 420 are retracted, accomplishing transfer and storage of the cargo box from the second position 42.

EXAMPLE 5

FIGS. 20 to 28 show a fifth embodiment.

During cargo handling, the cargo box delivery units 3 in the robots of the third and fourth embodiments cannot autonomously adjust their widths to adapt to various cargo boxes of different widths. In order to overcome this, a robot according to this embodiment employs a cargo box delivery unit capable of adapting itself to a width of a cargo box. The robot of this embodiment includes the same drive unit 1 and cargo box storing unit 2 as in the third and fourth embodiments, and description thereof is omitted here.

As shown in FIGS. 20, 21, 22 and 23, the self-adaptive cargo box delivery unit 5 of this embodiment includes an underframe 510, hook-and-pull fork tooth modules 520, an extension-retraction drive module 530, an extension-retraction slide rail module 540, a follower mechanism 550, a rotation drive module 560, sensors, clamp holding drive modules 580, a clamp holding slide rail module 590 and a baseplate 511. The baseplate 511 is arranged on the underframe 510, and a rotational device 561 disposed at the center of the underframe 510 can be driven by the rotation drive module 560 to drive the baseplate 511 to rotate. The hook-and-pull fork tooth modules 520, the extension-retraction drive module 530, the extension-retraction slide rail module 540, the follower mechanism 550, the rotation drive module 560, the sensors, the clamp holding drive modules 580 and the clamp holding slide rail module 590 are all disposed on the baseplate 511. The hook-and-pull fork tooth modules 520 are arranged at opposing sides of the baseplate 511 and configured to be able to telescope so as to extend beyond one end of the baseplate 311 and retract back. As shown, the direction of extension is denoted as A, and the direction of retraction as B. The hook-and-pull fork tooth modules 520 are provided at the sides of the baseplate 311 in parallel to the A-B direction and configured to extend out of the baseplate 311 from its end directed toward the direction A (i.e., its front end). Here, the end of the baseplate 511 where the hook-and-pull fork tooth modules 520 extend out of the baseplate 511 is referred to as its front end, while its end opposite to the front end is referred to as a rear end. The extension-retraction drive module 530, the extension-retraction slide rail module 540 and the follower mechanism 550 are provided on the baseplate 511. The extension-retraction drive module 530 is coupled to the hook-and-pull fork tooth modules 520 so as to be able to drive the hook-and-pull fork tooth modules 520 to telescope in the A-B direction. The follower mechanism 550 is coupled to the hook-and-pull fork tooth modules 520 so as to be able to move together with the hook-and-pull fork tooth modules 520. The extension-retraction slide rail module 540 is coupled to the follower mechanism 550 so as to allow it to move on the extension-retraction slide rail module 540. A cargo box 4 may be placed on the follower mechanism 550 so as to be able to move with the follower mechanism 550 into or out of the cargo box delivery unit 3. The rotational device 561 can rotate the hook-and-pull fork tooth modules 520 and orient them at a specified angle. The clamp holding drive modules 580 are coupled to the hook-and-pull fork tooth modules 520 and can drive them to move relative to each other in a C-D direction, thereby modifying the distance between them to a value suitable for a width of an intended cargo box 4. As shown, the C-D direction is perpendicular to the A-B direction. The C-D direction is parallel to a widthwise direction of the baseplate 511, and the A-B direction is parallel to a lengthwise direction of the baseplate 511. The clamp holding slide rail module 590 is coupled to the hook-and-pull fork tooth modules 520 so as to enable the hook-and-pull fork tooth modules 520 to slide in the C-D direction on the clamp holding slide rail module 590.

Referring to FIG. 12, the hook-and-pull fork tooth modules 520 may be of the same structure as that of any of the third and fourth embodiments. This embodiment is described in the context of the hook-and-pull fork tooth modules 520 being structured in the same way as in the third embodiment, as an example. The hook-and-pull fork tooth modules 520 are disposed at opposite sides of the baseplate 511 in parallel to the A-B direction. That is, each of the hook-and-pull fork tooth modules 520 is disposed at one of the two sides of the baseplate 511. The two hook-and-pull fork tooth modules 520 are of the same structure. Each hook-and-pull fork tooth module 520 includes a swinging rod device 521, a telescopic fork tooth device 522, a push plate 323 and a cargo box stop plate 524. The cargo box stop plates 524 are disposed in opposition to each other and serve to limit the position of and guide a cargo box by defining a distance therebetween matching a width of the cargo box. In this way, the self-adaptive cargo box delivery unit 5 can be used to handle various cargo boxes of different widths.

The telescopic fork tooth device 522 includes an inner fork tooth 5221, an intermediate fork tooth 5222 and an outer fork tooth 5223. The outer fork tooth 5223 is position on an inner side of a cover, preferably on an inner side of a side cover 512. The outer fork tooth 5223 is fixed to the baseplate 511, and the intermediate fork tooth 5222 is mounted to an inner side of the outer fork tooth 5223. The inner fork tooth 5221 is mounted to an inner side of the intermediate fork tooth 5222, and the swinging rod device 521 is mounted to an outer side of the inner fork tooth 5221 at an end thereof directed toward the A direction. The push plate 523 is mounted to an inner side of the inner fork tooth 5221 at an end thereof farther away from the swinging rod device 521. The intermediate fork tooth 5222 and the inner fork tooth 5221 can move forth and back in the A-B direction to transfer a cargo box 4 between a shelf 40 and the follower mechanism 550. The intermediate fork tooth 5222 is provided with a first timing pulley 52221, a tensioning means 52222, a second timing belt 52223 and a second timing pulley 52224. The first timing pulley 52221 and the second timing pulley 52224 are provided at opposite ends of the intermediate fork tooth 5222 opposing each other along the telescoping direction. The second timing belt 52223 is wound into an open ring, with its both ends being affixed to the tensioning means 52222, which is in turn secured at the side of the intermediate fork tooth 5222 directed toward the inner fork tooth 5221. A center line of the second timing belt 52223 is aligned at its both ends with the centers of the first timing pulley 52221 and the second timing pulley 52224. This enables the second timing belt 52223 to move with the fork teeth. When the intermediate fork tooth 5222 moves under the drive of the extension-retraction drive module 530, the inner fork tooth 5221 will move together with the intermediate fork tooth 5222. As a result, both the intermediate fork tooth 5222 and the inner fork tooth 5221 extend outwardly. Preferably, the movement of the intermediate fork tooth 5222 occurs at an initial speed V1, and the movement of the inner fork tooth 5221 occurs at a speed V2. Here, the speed of the inner fork tooth 5221 refers to a speed at which it moves forth and back and is twice the initial speed V1. The swinging rod device 521 includes a swinging rod 5211, a swinging rod stopper 5212, a coupling 5213 and a swinging rod motor 5214. The swinging rod devices 521 are mounted at the respective outer sides of the two inner fork teeth 5221 (i.e., the sides thereof directed toward the respective intermediate fork teeth 5222) and at the respective ends thereof away from the respective push plates 523. The swinging rod 5211 is able to pivot with respect to the telescoping direction of the fork teeth, and when the swinging rod 5211 becomes parallel to the follower mechanism 550, it is considered as being in a deployed configuration. When it is oriented in parallel to the inner fork tooth 5221, it is considered as being in a withdrawn configuration. When in this configuration, the swinging rod 5211 moves from a proximal end of a cargo box 4 placed on a shelf 40 to a distal end thereof, and then pivots into the deployed configuration. In this way, the cargo box 4 on the shelf 40 can move with the telescopic fork tooth devices 522 into the cargo box delivery unit 3.

Figures 21, 22:
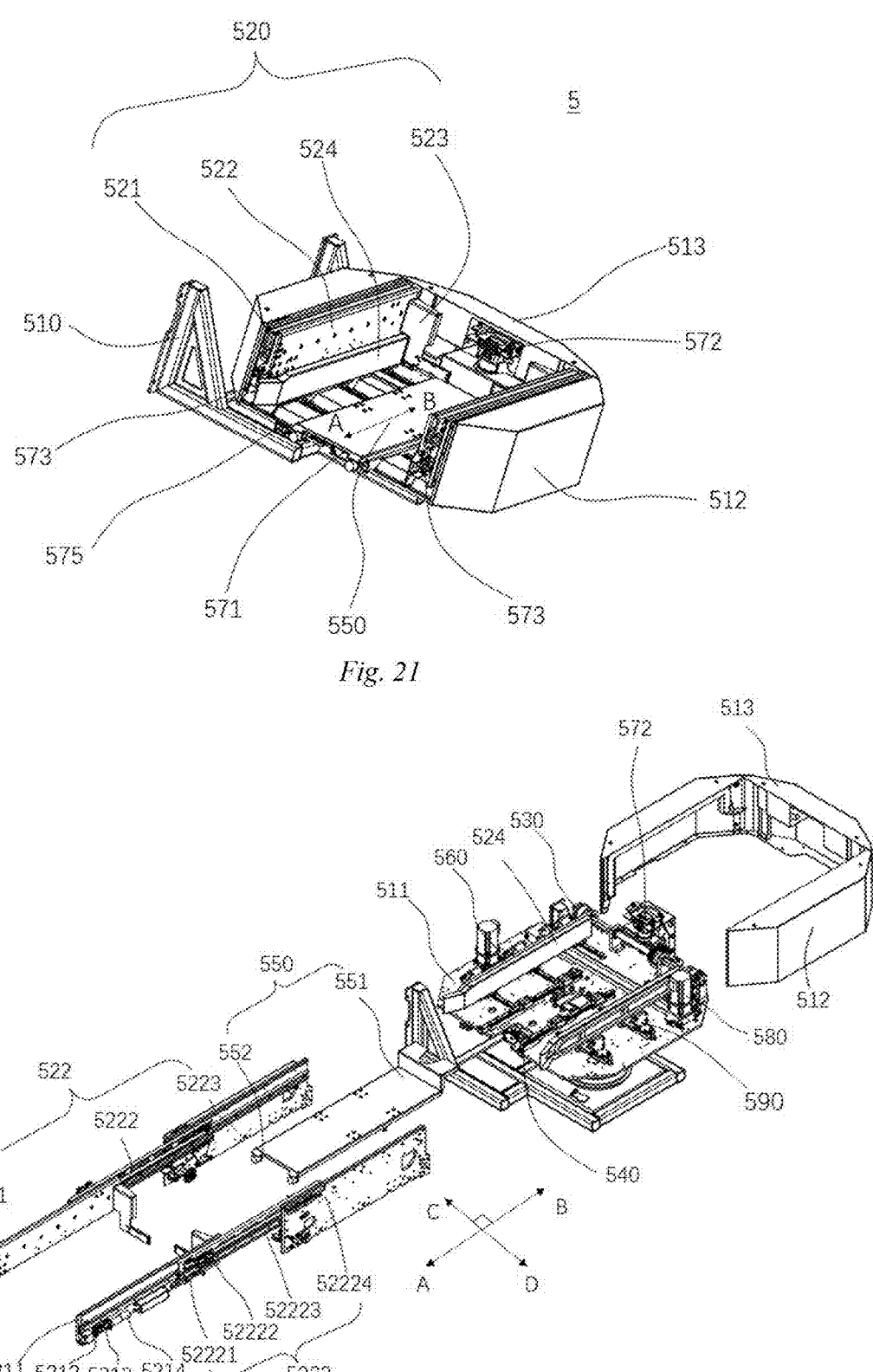
FIG. 21 is a diagram showing the structure of a cargo box delivery unit according to the fifth embodiment.
FIG. 22 is a schematic exploded view of FIG. 21.
Figure 25:
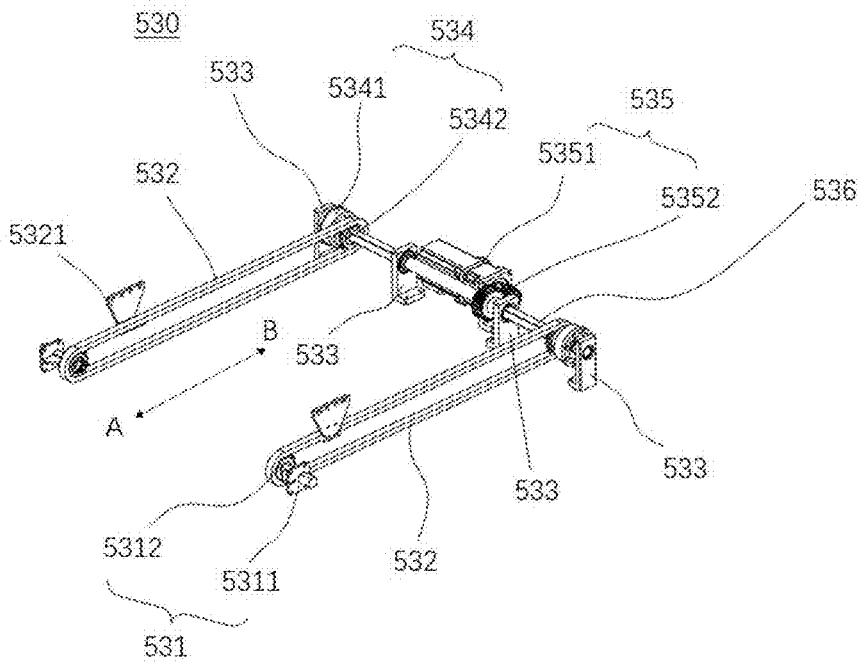
FIG. 25 is a schematic diagram showing the structure of an extension-retraction drive module in the robot of the fifth embodiment.

Referring to FIG. 22, the extension-retraction drive module 530 is mounted on the baseplate 511. As shown in FIG. 25, the extension-retraction drive module 530 includes chain idler pulley assemblies 531, chains 532, bearing seats 533, rotating and sliding units 534, an extension-retraction drive unit 535 and a rotating shaft 536. The bearing seats 533 are provided at the opposite sides of the rear end of the baseplate 511, and the rotating shaft 536 is mounted on the two bearing seats 533. The rotating and sliding units 534 are mounted, so as to be able to slide, on the rotating shaft 536. Each rotating and sliding unit 534 includes a sliding seat 5341 and a rotating sprocket 5342. The sliding seat 5341 can slide on the rotating shaft 536, but does not rotate with the rotating shaft 536. The rotating sprocket 5342 can slide on the rotating shaft 536 and rotate with the rotating shaft 536 to transmit a torque. The extension-retraction drive unit 535 includes a drive motor 5351 and a gear assembly 5352. The drive motor 5351 is mounted on the baseplate 511 and coupled to the gear assembly 5352. The gear assembly 5352 is coupled to the rotating shaft 536 and can drive the rotating shaft 536 to rotate therewith. The chain idler pulley assemblies 531 are provided at the opposite sides of the front end of the baseplate 511 and each include tensioning shaft 5311 and a chain idler pulley 5312. The tensioning shafts 5311 are mounted to the outer fork teeth 5223, and the chain idler pulleys 5312 are fitted on the tensioning shafts 5311. The chains 532 are provided at the opposite sides of the baseplate 511. Each chain 532 is engaged at one end with the respective rotating sprocket 5342 and at the other end with the respective chain idler pulley 5312. Each chain 532 is provided thereon with a coupling block 5321 which is attached at one end to the specific chain 532 and at the other end to the respective intermediate fork tooth 5222. When the drive motor 5351 rotates, it will drive rotation of the gear assembly 5352 and hence of the rotating shaft 536. As a result, the rotating sprockets 5342 drive the chains 532 to move, causing the coupling blocks 5321 and hence the intermediate fork teeth 5222 to move with the chains 532 forth and back in the A-B direction.

Figure 23:
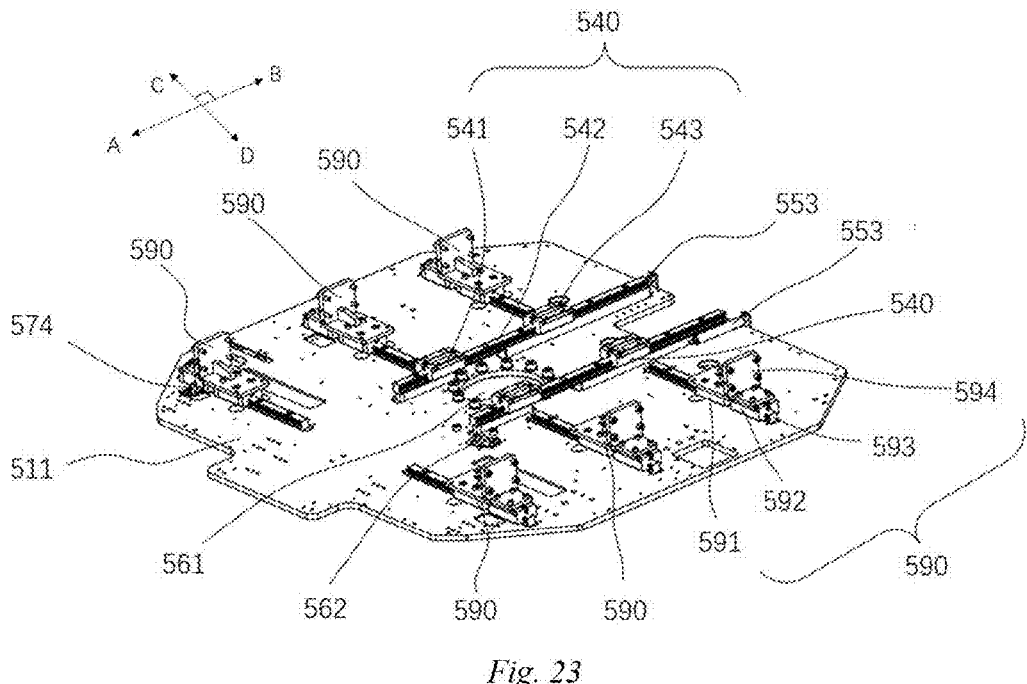
FIG. 23 is a schematic diagram showing the structure of a baseplate in the robot of the fifth embodiment.

Referring to FIG. 22, the follower mechanism 550 and the extension-retraction slide rail module 540 are the same as their counterparts disclosed within the third embodiment. The follower mechanism 550 is adapted to carry a cargo box and move together with the telescopic fork tooth devices. The follower mechanism 550 includes a plate-shaped member 551 for carrying a cargo box. During extension of the telescopic fork tooth devices 522, the plate-shaped member 351 moves therewith and comes into abutment with a shelf 40. Preferably, the plate-shaped member 551 is provided with rubber pads 552 at its end directed toward the shelf 40. Upon the plate-shaped member 551 coming into abutment with the shelf, the rubber pads 552 are located between the plate-shaped member 551 and the shelf 40 and provide a buffering effect. That is, the rubber pads 552 are in contact with a panel of the shelf. The extension-retraction slide rail module 540 is mounted on the baseplate 511. Referring to FIG. 23, the extension-retraction slide rail module 540 is used to carry the follower mechanism 550 and allow it to move on the extension-retraction slide rail module 540. Either one or more extension-retraction slide rail modules 540 may be provided. Preferably, as shown, two extension-retraction slide rail modules 540 of the same structure are provided at the opposite sides of the baseplate 511. In some embodiments, each extension-retraction slide rail module 540 includes a first slider 541, a slide rail 542 and a second slider 543. The first slider 541 and the second slider 543 are able to slide freely on the slide rail 542. The follower mechanism 550 is mounted on the first sliders 541 and the second sliders 543. Preferably, springs 553 are connected between the end of the follower mechanism 550 directed away from the direction of extension and the rear end of the baseplate 511. In order to store a cargo box 4, the cargo box

4 is placed on the surface of the follower mechanism 550. As a result of the telescopic fork tooth devices 522 being extended, the follower mechanism 550 moves therewith, and upon the rubber pads 552 coming into contact with an intended panel of the shelf 40, the cargo box 4 is pushed into the panel by the push plate 523. In this way, a higher rate of success in storing the cargo box 4 can be achieved.

Figure 26:
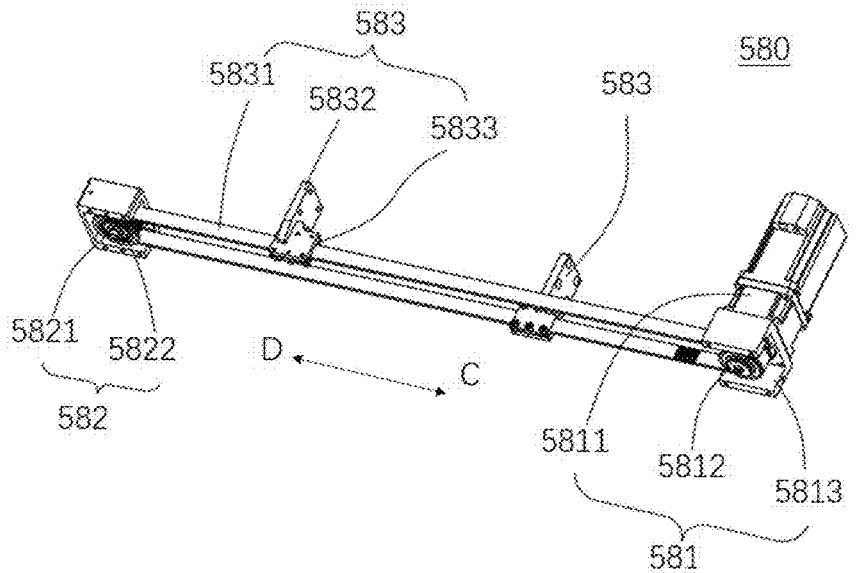
FIG. 26 is a schematic diagram showing the structure of a clamp holding drive module in the robot of the fifth embodiment.

Referring to FIGS. 22 and 26, the clamp holding drive modules 580 drive the telescopic fork tooth devices 522 to move in the C-D direction on the clamp holding slide rail module 590, adapting a distance between the telescopic fork tooth devices 522 to a width of the cargo box 4. Each clamp holding drive module 580 includes a drive component and a transmission mechanism. The drive components are coupled to the respective transmission mechanisms, which are in turn coupled to the outer fork teeth 5223. Under the drive of the drive components, the outer fork teeth 5223 and hence the cargo box stop plates 524 move in the C-D direction, thereby defining a width of the cargo box delivery unit 5. In this way, cargo boxes of different widths can be handled. The drive components may be selected as, for example, motors, pneumatic cylinders, or hydraulic cylinders. The transmission mechanisms may be selected as, for example, chain transmissions, band transmissions, or screw transmissions. Preferably, as shown in FIG. 26, each clamp holding drive module 580 includes a drive unit 581, a timing belt idler pulley assembly 582 and a timing belt unit 583. The timing belt idler pulley assembly 582 includes an idler pulley bracket 5821 and an idler pulley 5822. The idler pulley bracket 5821 is mounted to the baseplate 511, and the idler pulley 5822 is rotatably mounted on the idler pulley bracket 5821. The drive unit 581 includes a drive motor 5811, a timing pulley 5812 and a drive bracket 5813. The drive bracket 5813 is mounted to the baseplate 511 at the side thereof opposite to the idler pulley bracket 5821. The drive motor 5811 is mounted to the drive bracket 5813, and the timing pulley 5812 is engaged with the drive motor 5811. The timing belt unit 583 includes a timing belt 5831, a clamp holding coupling block 5832 and a timing belt tensioner 5833. One end of the timing belt 5831 is engaged with the timing pulley 5812, and the other end is engaged with the idler pulley 5821. The clamp holding coupling block 5832 and the timing belt tensioner 5833 are jointly attached to the timing belt 5831. The clamp holding coupling blocks 5832 are further attached to the outer fork teeth 5223. When the drive motor 5811 rotates, the timing pulley 5813 is driven to rotate, causing the clamp holding coupling block 5832 to move. As a result, the respective telescopic fork tooth device 522 moves in the C-D direction on the clamp holding slide rail module 590.

Referring to FIG. 22, the clamp holding slide rail module 590 is used to support the outer fork teeth and define a travel path for the outer fork teeth in the C-D direction. The clamp holding slide rail module 590 is provided on the baseplate 511 at the same sides thereof as the outer fork teeth. A plurality of clamp holding slide rail modules 590 may be arranged side-by-side along a lengthwise direction of the outer fork teeth. This enables more stable movement of the outer fork teeth in the C-D direction. All the clamp holding slide rail modules 590 may be of the same structure. Preferably, the clamp holding slide rail module 590 includes a first clamp holding slider 591, a second clamp holding slider 592, a clamp holding slide rail 593 and a clamp holding slider connector 594. The first clamp holding slider 591 and the second clamp holding slider 592 can slide freely on the clamp holding slide rail 593. The clamp holding slider connector 594 is connected to both the first clamp holding slider 591 and the second clamp holding slider 592 and attached to the outer fork teeth 5223. The telescopic fork tooth devices 522 and the cargo box stop plates 524 can move on the clamp holding slide rail 593.

Figure 24:
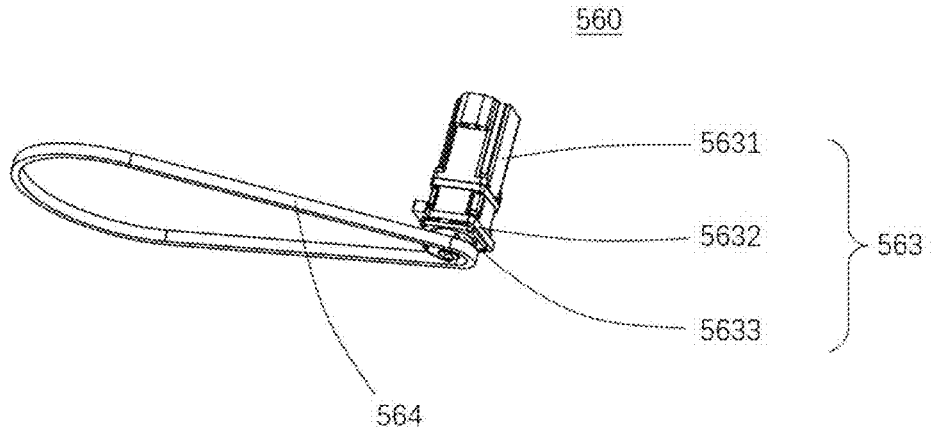
FIG. 24 is a schematic diagram showing the structure of a rotation drive module in the robot of the fifth embodiment.

Referring to FIG. 24, the rotation drive module 560 includes a rotation drive unit 563 and a rotation drive chain 564. The rotation drive unit 563 includes a rotation drive motor 5631, a rotation drive bracket 5632 and a rotation drive sprocket 5633. The rotation drive bracket 5632 is mounted to the baseplate 511, and the rotation drive chain 564 is engaged at one end to the rotation drive sprocket 5633 and at the other end with the rotational device 561. The rotation drive motor 5631 drive the rotation drive sprocket 564 to rotate, thereby causing the rotation drive chain 564 to rotate the rotational device 561 and hence the baseplate 511. The rotational device 561 is mounted at the center of the underframe 510 and can drive the baseplate 511 and the hook-and-pull fork tooth modules 520 mounted thereon to rotate to direct the opening defined by the hook-and-pull fork tooth modules 520 toward a cargo box.

In some embodiments, the cargo box delivery unit 3 further includes covers which are fixed on the outside of the baseplate 511 and cover the hook-and-pull fork tooth modules 520, providing protection to the hook-and-pull fork tooth modules 520. The covers include a rear over 513 and side covers 512. The rear over 513 is fixed at the rear end of the baseplate 511. There are two side covers 512, which are provided at the opposite sides of the baseplate 511 in parallel to the A-B direction on the outer sides of the outer fork teeth 5223. The rear over 513 is connected at its opposite ends to the two side covers 512, while an opening 314 is defined at the side opposite to the rear over 513, i.e., the front end of the baseplate 511. The hook-and-pull fork tooth modules 520 can telescope from the opening.

Referring to FIGS. 21 and 23, the sensors includes a cargo box shape sensor 572, a path detection sensor 573, a hook-and-pull pose sensor 571, a cargo box detection sensor 575, a rotation stop sensor 562 and a signal sensor 574. As shown, the signal sensor 574 is mounted to the baseplate 511 and positioned at the clamp holding slide rail module 590. It is used to initialize a start position for the hook-and-pull fork tooth modules 520. The rotation stop sensor 562 is positioned around the rotational device and used to detect an angular orientation of the baseplate 511 that is being rotated by the rotational device. As shown, the shape sensor 572 is mounted at the rear end of the baseplate 511, possibly on the rear over 513, and used to detect dimensions of a cargo box. It may be implemented as a vision sensor or another sensor capable of acquiring geometric information. The path detection sensor 573 is mounted at the front end of the baseplate 511 and used to identify whether there is an obstacle in a telescoping path for the hook-and-pull fork tooth modules 520. It may be implemented as a vision sensor or another sensor capable of acquiring pose information. The hook-and-pull pose sensor 571 is used to detect the presence of a cargo box. It may be implemented as a vision sensor or another sensor capable of acquiring pose information. The cargo box detection sensor 575 is used for shelf panel and cargo box identification and distance detection. It may be implemented as a vision sensor or another sensor capable of acquiring pose information.

Figure 27:
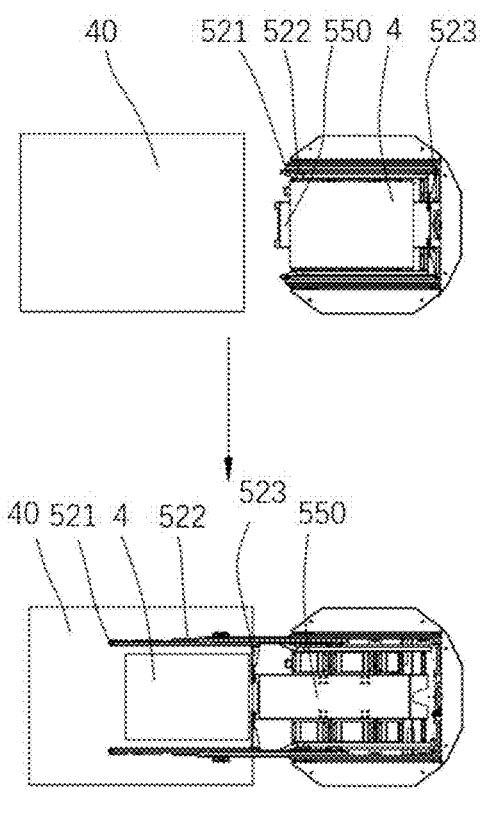
FIG. 27 schematically illustrates a process of transferring a cargo box using the robot of the fifth embodiment.

FIG. 27 shows a process of storing a cargo box by the swinging rod devices 521, the telescopic fork tooth devices 522, the follower mechanism 550 and the push plates 523. The cargo box 4 is placed on the surface of the hook-and-pull follower mechanism 550, as a result of the telescopic fork tooth devices 522 being extended from the end away from the push plates 523, the follower mechanism 550 moves therewith until the rubber pads 552 come into contact with an intended layer of a shelf 40. The cargo box 4 is then pushed onto the layer of the shelf 40 by the push plates 523. In this way, a higher rate of success in storing the cargo box can be achieved.

Figure 28:
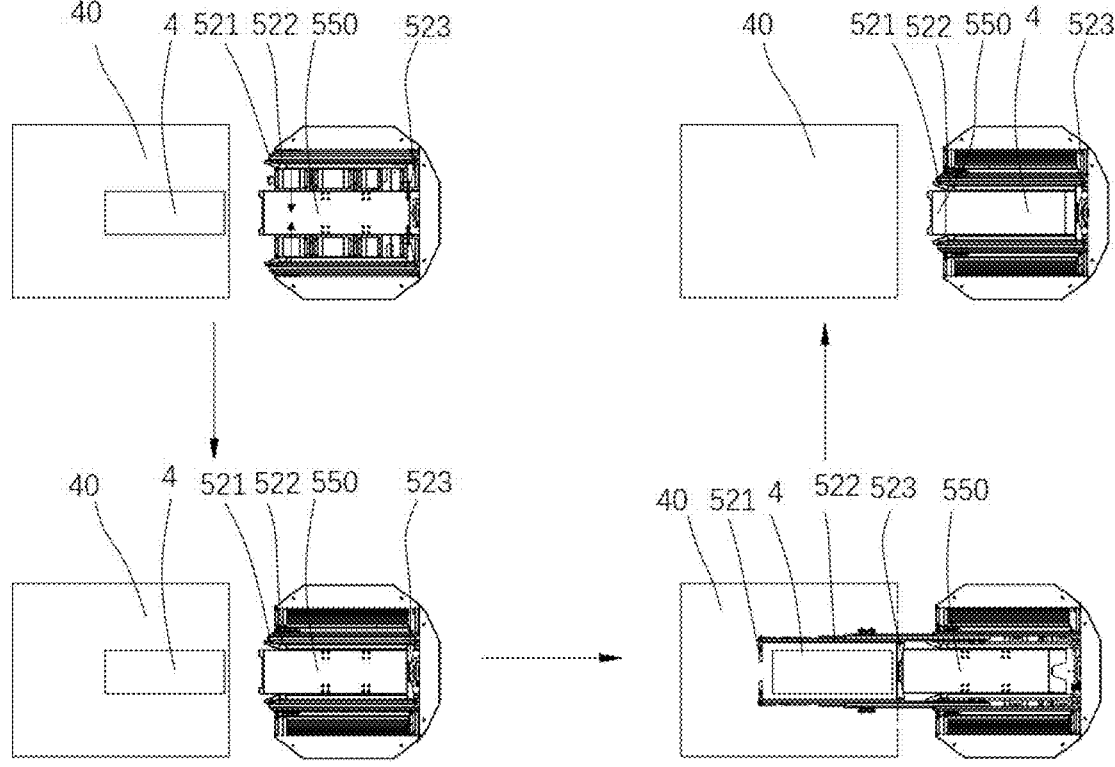
FIG. 28 schematically illustrates a process of the robot of the fifth embodiment self-adapting itself to a width of a cargo box.

FIG. 28 shows a process of fetching a cargo box by the swinging rod devices 521, the telescopic fork tooth devices 522, the follower mechanism 550 and the push plates 523. The cargo box 4 is placed on a panel of a fixed shelf 40. The shape sensor 572 detects dimensions of the cargo box 4 that is aligned with the shape sensor. After that, the clamp holding drive modules 580 drive the hook-and-pull fork tooth modules 520 to move so that a width defined therebetween matches that of the cargo box 4. The extension-retraction drive module 530 drives the intermediate fork teeth 5222 and the inner fork teeth 5221 to move toward the cargo box 4 until they reach matching positions. In this process, the follower mechanism 550 moves to bring the rubber pads 552 into contact with the layer of the shelf 40. After the swinging rod motors 5214 drive the swinging rods 5211 and thereby orient them horizontally, the extension-retraction drive module 530 retracts the intermediate fork teeth 5222 and the inner fork teeth 5221 to their initial positions. As a result, the cargo box 4 is pulled by the swinging rod devices 521 onto the surface of the follower mechanism 550. The follower mechanism 550 is then pushed by the push plates 523 back to its initial position, thus completing the process.

Operation of the robot of this embodiment may involve movement of the transporting robot on the ground from an initial position to a specified position by means of the drive unit. The transporting robot then moves the cargo box delivery unit 5 to a specified height using the lifting module 220 in the cargo box storing unit 2 and rotates the telescopic fork tooth devices 522 to a specified angular position using the rotational device 561 in the cargo box delivery unit 5. The shape sensor 572 measures a width of the cargo box 4, and the clamp holding drive modules 580 move the hook-and-pull fork tooth modules 520 to appropriate positions. The hook-and-pull fork tooth modules 520 are then extended and retracted to fetch the cargo box 4 from the panel of the fixed shelf 40, and the lifting module 220 of the cargo box storing unit 2 moves the hook-and-pull fork tooth modules 520 and the cargo box 4 to a specified height, where the rotational device 561 in the self-adaptive cargo box delivery unit 5 rotates them to another specified angular position. After that, the hook-and-pull fork tooth modules 520 place the cargo box 4 onto a panel 212. Finally, the hook-and-pull fork tooth modules 520 are withdrawn, thereby completing the process.

EXAMPLE 6

Figure 29:
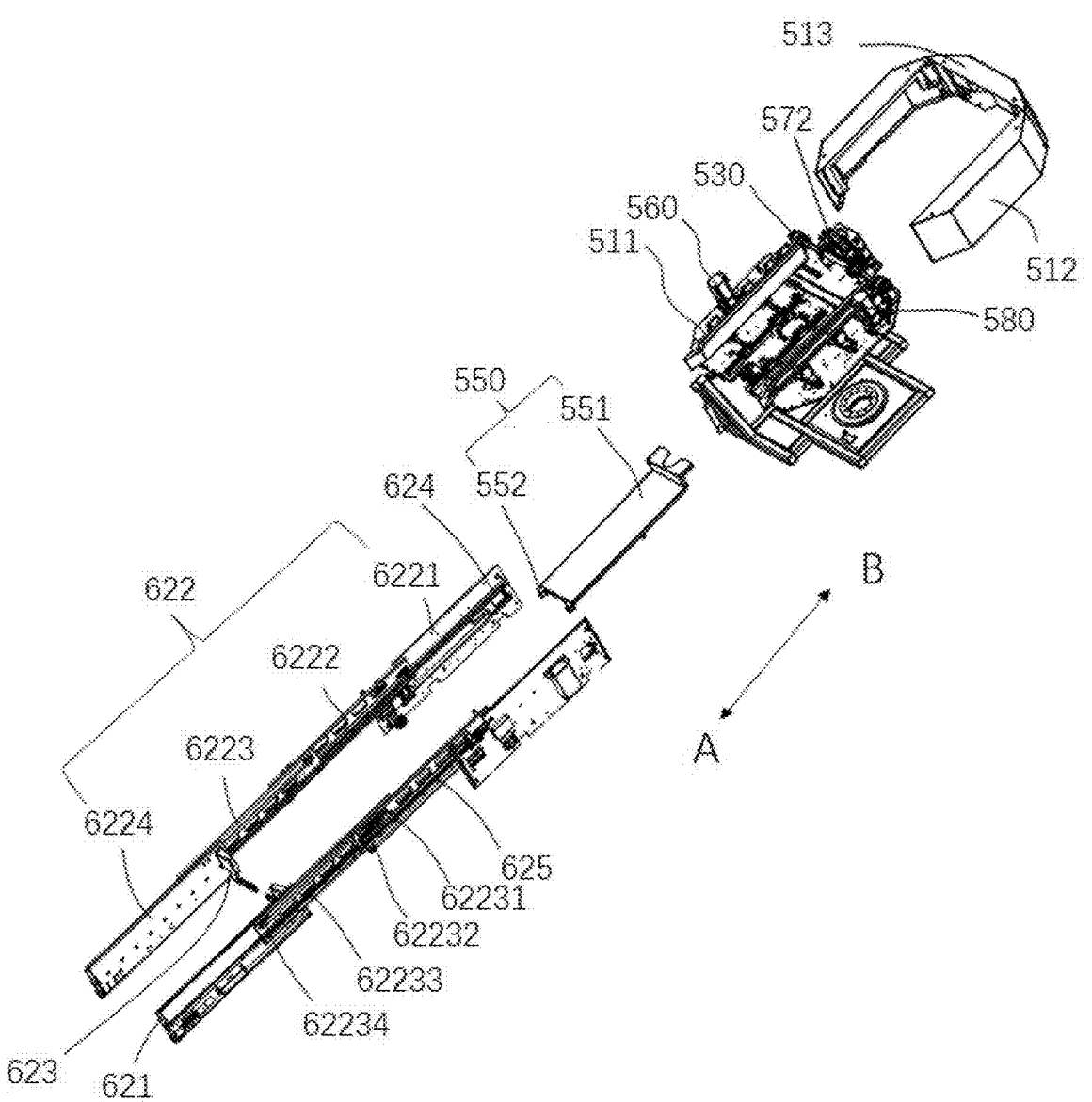
FIG. 29 is a schematic exploded view of a cargo box delivery unit in a robot according to a sixth embodiment.

FIG. 29 shows a sixth embodiment.

This embodiment is substantially similar to the fifth embodiment, i.e., including the same drive unit 1 and cargo box storing unit 2. Moreover, a cargo box delivery unit 6 according to this embodiment has the same underframe 510, extension-retraction drive module 530, extension-retraction slide rail modules 540, follower mechanism 550, rotation drive module 560, sensors, clamp holding drive modules 580 and clamp holding slide rail module 590. This embodiment differs from the fifth embodiment in that the cargo box delivery unit 6 of this embodiment has one added telescopic stage. The cargo box delivery unit 6 of this embodiment has telescopic fork tooth devices 622 that are the same as the double-telescoping telescopic fork tooth devices 422 in the fourth embodiment. That is, each hook-and-pull fork tooth module of this embodiment includes a double-telescoping swinging rod device 621, a double-telescoping telescopic fork tooth device 622 and a push plate. Each double-telescoping telescopic fork tooth device includes a fixed fork tooth 6221, a first fork tooth 6222, a second fork tooth 6223 and a third fork tooth 6224. The fixed fork teeth 6221 are fixed at opposite sides of the baseplate 611 along the A-B direction. The first fork tooth 6222 is mounted to an inner side of the fixed fork tooth 6221, and the second fork tooth 6223 is mounted to an inner side of the first fork tooth 6222. The third fork tooth 6224 is mounted to an inner side of the second fork tooth 6223, and the double-telescoping swinging rod device 621 is mounted to an outer side of the third fork tooth 6224 at an end thereof proximal to a front end of the baseplate 611 (i.e., the end of the third fork tooth 6224 directed toward the A direction). The push plate 623 is mounted to an inner side of the first fork tooth 6222 at an end thereof distal from the front end of the baseplate 611 (i.e., the end of the first fork tooth 6222 directed toward the B direction). The first fork tooth 6222, the second fork tooth 6223 and the third fork tooth 6224 can move forth and back in the A-B direction to transfer a cargo box 4 between a panel of a shelf 40 and the follower mechanism 550. Each of the first fork tooth 6222 and the second fork tooth 6223 includes a third timing pulley 62231, a tensioning means 62232, a third timing belt 62233 and a fourth timing pulley 62234. The third timing pulleys 62231 and the fourth timing pulleys 62234 are provided at opposite ends of the first fork tooth 6222 and the second fork tooth 6223. The tensioning means 62232 are mounted to both the fixed fork tooth 6221 and the first fork tooth 6222. The third timing belt 62233 is wound into an open ring, with its both ends being affixed to the tensioning means 62232. The tensioning means 62232 are fixed respectively at a middle location between the fixed fork tooth 6221 and the first fork tooth 6222 and at a middle location between the first fork tooth 6222 and the second fork tooth 6223. Center lines of the third timing belts 62233 are aligned at both ends with the centers of the timing pulleys, enabling the third timing belts 62233 to move with the fork teeth. When the first fork teeth 6222 are driven by the extension-retraction drive module 530 to move at an initial speed V1, the second fork teeth 6223 move with the movement of the first fork teeth 6222 at a speed V2, and it is configured that the speed V2 at which the second fork teeth 6223 move forth and back is twice the initial speed V1. The third fork teeth 6224 move with the movement of the second fork teeth 6223 at a speed V3, and it is configured that the speed V3 at which the third fork teeth 6224 move forth and back is thrice the initial speed V1.

The fixed fork teeth 6221 are provided on their inner sides with slide rail grooves 624 extending in the A-B direction, and the first fork teeth 6222 are provided on their outer sides with slide rails 625 extending in the A-B direction. The first fork teeth 6222 are provided on their inner sides with slide rail grooves 624 extending in the A-B direction, and the second fork teeth 6223 are provided on their outer sides with slide rails 625 extending in the A-B direction. The second fork teeth 6223 are provided on their inner sides with slide rail grooves 624 extending in the A-B direction, and the third fork teeth 6224 are provided on their outer sides with slide rails 625 extending in the A-B direction. The slide rail grooves 624 and the slide rails 625 are provided at the same height.

The double-telescoping swinging rod devices 621 are mounted to the third fork teeth 6224. They are structured and operate in the same manner as the swinging rod devices 321 of the third embodiment and, therefore, need not be described in further detail herein.

EXAMPLE 7

FIGS. 30 to 34 show a seventh embodiment.

The robots of the first to sixth embodiments are able to transfer a cargo box between the cargo box storing unit and a shelf. More and more modern warehouses begin to utilize higher shelves for more complete storage space utilization and higher goods storage capacity. Accordingly, more and more existing transporting robots are endowed with the ability to reach greater heights, in order to access goods stored at the top of those shelves. However, this could be problematic because increases in height mean greater tendency of such transporting robots to suffer from gantry wobbling when handling goods positioned at high places. This can heavily affect operation of the transporting robots and may create potential safety hazards.

On the basis of the first to sixth embodiments, the present embodiment proposes a robot for transporting cargo boxes, which may incorporate the structure of any of the first to sixth embodiments and includes an aerial stabilization mechanism 7 mounted in front of the cargo box delivery unit 3. When the cargo box delivery unit 3 reaches a specified height, the aerial stabilization mechanism 7 can abut against shelves 40 or walls on opposite sides of the robot, thereby increasing stability of the robot when it is handling goods placed at a high location.

Figure 30:
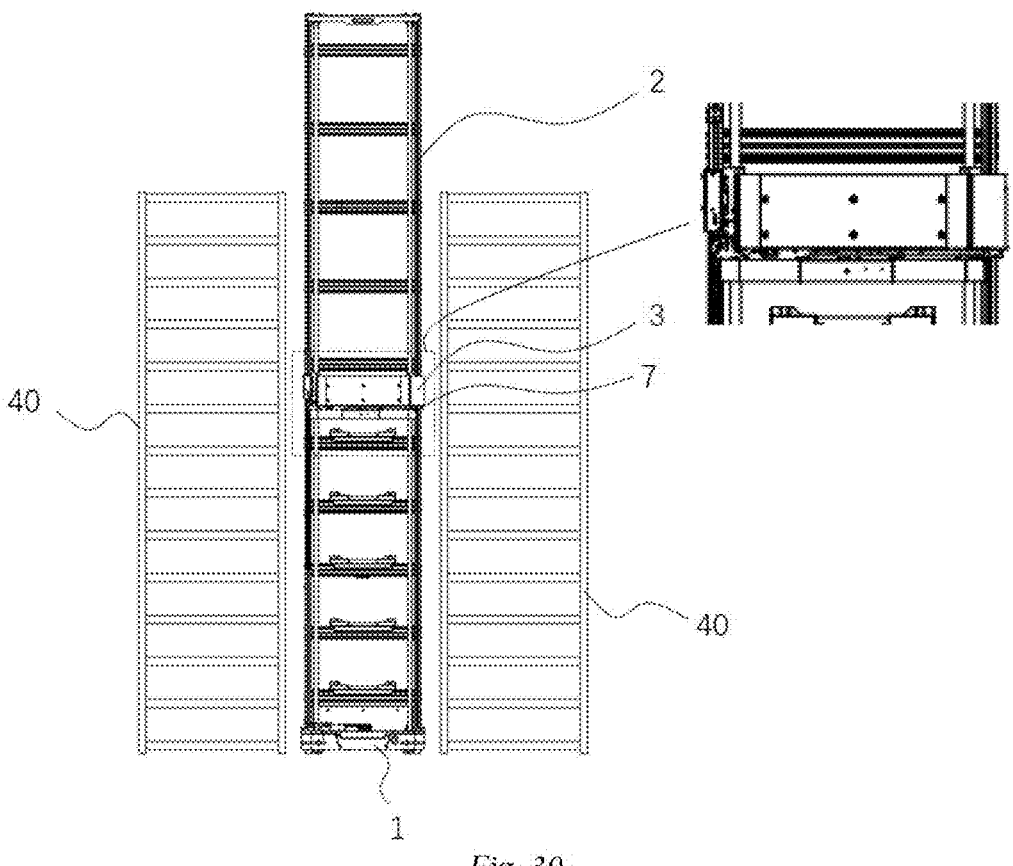
FIG. 30 is a schematic diagram showing the structure of a robot according to a seventh embodiment, in which an aerial stabilization mechanism has not extended yet.
Figure 31:
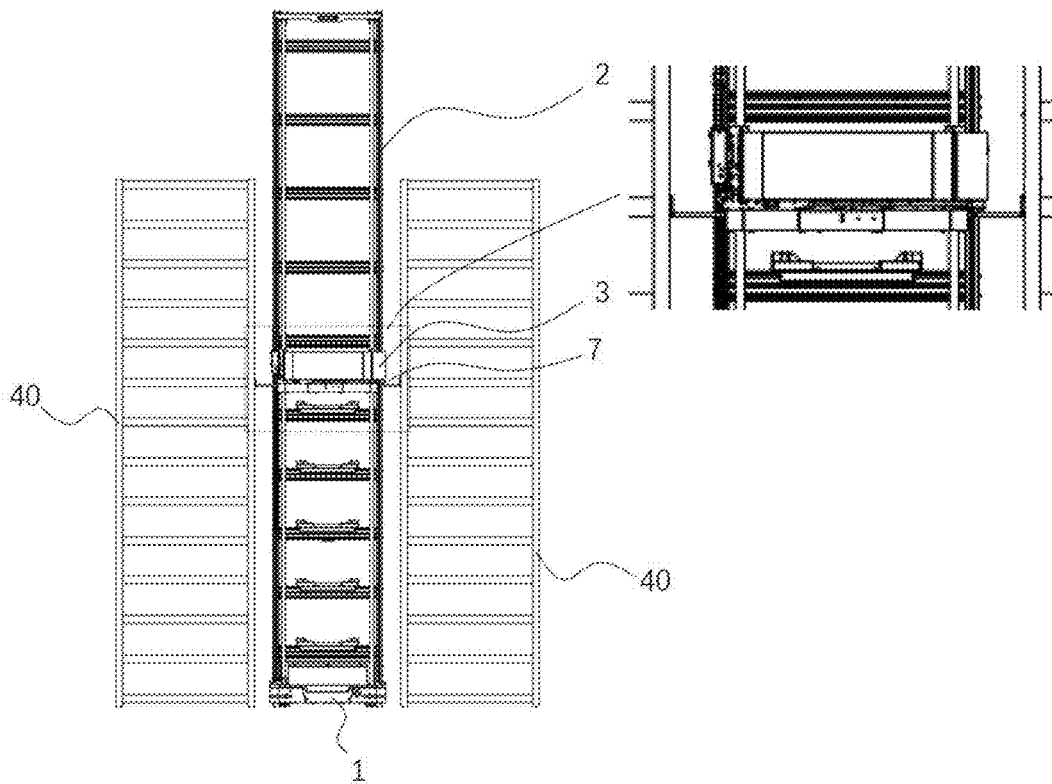
FIG. 31 is a schematic diagram showing the structure of the robot of the seventh embodiment, in which the aerial stabilization mechanism has extended out.
Figure 32:
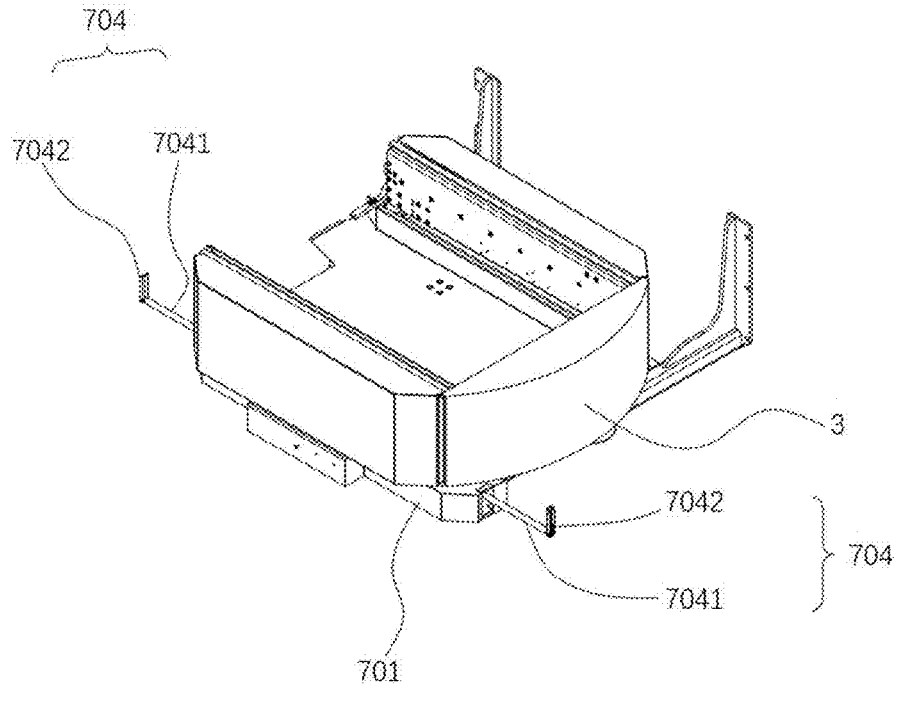
FIG. 32 schematically illustrates how the aerial stabilization mechanism of the seventh embodiment is connected.

As shown in FIGS. 30, 31 and 32, the aerial stabilization mechanism 7 is mounted to the cargo box delivery unit 3, which is in turn mounted, as in the third to sixth embodiments, to the lifting module 220 of the cargo box storing unit 2. In this way, the aerial stabilization mechanism 7 can move with the cargo box delivery unit 3 on the cargo box storing unit 2. Thus, when the transport cargo box robot is handling goods at any height between shelves, the aerial stabilization mechanism can always deliver its function.

Figure 33:
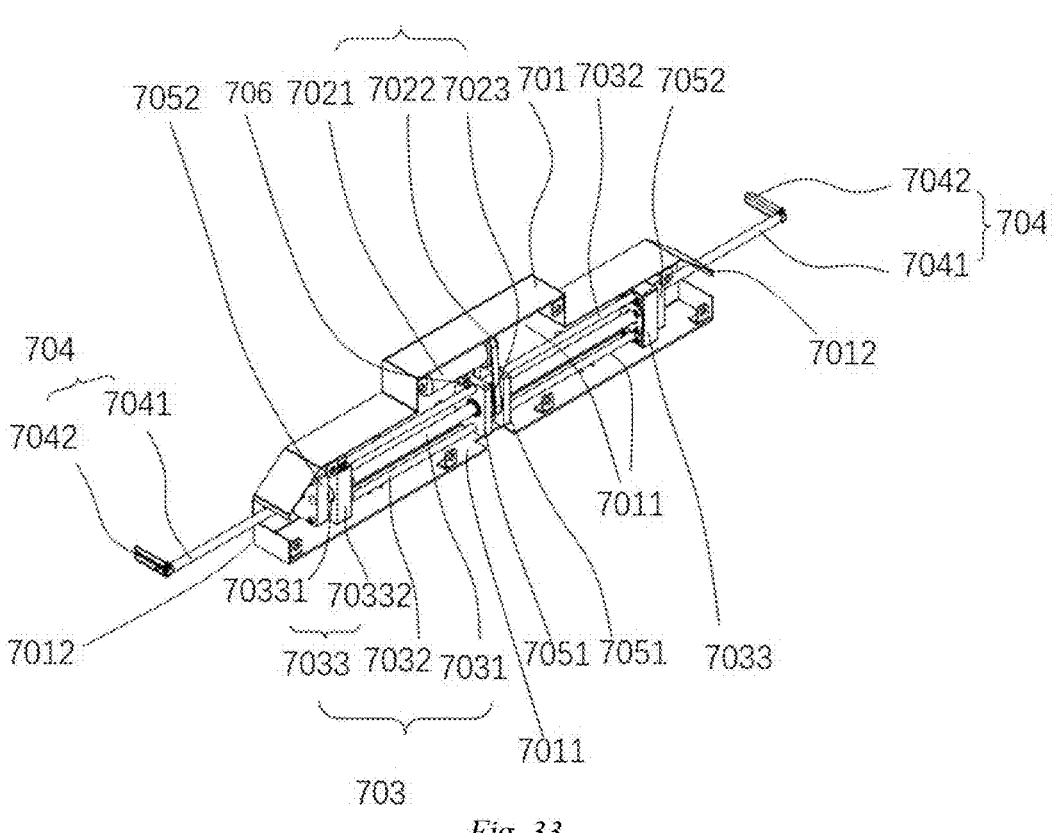
FIG. 33 is a schematic diagram showing the structure of the aerial stabilization mechanism of the seventh embodiment.

As shown in FIG. 33, the aerial stabilization mechanism includes a fixation plate 701, a drive assembly 702, a transmission mechanism 703, support assemblies 704 and fixation bases. The fixation plate 701 is attached to the cargo box delivery unit 3 and used to support the entire aerial stabilization mechanism 7. The drive assembly 702 is disposed at an inner side of the fixation plate 701 and coupled to the transmission mechanism 703. The transmission mechanism 703 is coupled to the support assemblies 704 and used to transmit motion from the drive assembly 702 to the support assemblies 704. The support assemblies 704 can be extended from opposite ends of the fixation plate 701 and retracted. The support assemblies 704 have a first position and a second position. At the first position, the support assemblies 704 are retracted within the fixation plate 701 (see FIG. 30). At the second position, the support assemblies 704 are extended from the opposite ends of the fixation plate 701 (see FIG. 31). When at the second position, the support assemblies 704 can abut against shelves to provide aerial stabilization. The fixation bases are disposed on the fixation plate 701 and used to support the transmission mechanism 703 and the support assemblies 704.

The fixation plate 701 may be secured to the underframe 310 of the cargo box delivery unit 3 and is preferably located under the cargo box delivery unit 3. The aerial stabilization mechanism 7 is secured to the cargo box delivery unit 3 through the fixation plate 701 so as to be movable therewith. The fixation plate 701 has multiple walls together defining a cavity 7011, in which all the drive assembly 702, the transmission mechanism 703, the support assemblies 704 and the fixation base are accommodated. The fixation plate 701 defines openings 7012 at its ends opposing each other along a lengthwise direction thereof. The support assemblies 704 may be extended out of or retracted into the fixation plate 701 through the openings.

The drive assembly 702 includes a motor 7021, a drive pulley 7022, a timing belt and a driven pulley 7023. The motor 7021 is mounted at a middle location of the fixation plate 701 and has an output shaft coupled to the transmission mechanism 703. By means of the transmission mechanism 703, the support assemblies 704 can be simultaneously extended or retracted through the openings at the opposite ends of the fixation plate 701. The drive pulley 7022 is disposed at an output end of the motor 7021 and engaged with the driven pulley 7023 by the timing belt. The driven pulley 7023 is coupled to the transmission mechanism 703. It would be appreciated that the drive pulley 7022, the driven pulley 7023 and the timing belt may be replaced with a gear assembly.

The transmission mechanism 703 functions to convert rotation of the motor 7021 into linear movement of the support assemblies 704. As a result, the support assemblies 704 can be simultaneously extended or retracted through the two openings 7012. As the drive assembly 702 is disposed at the middle location of the fixation plate 701, in order to facilitate the extension or retraction of the support assemblies 704 through the opposite ends of the fixation plate 701, two transmission mechanisms 703 of the same structure may be provided at opposite sides of the fixation plate 701. Preferably, the transmission mechanism 703 includes a bidirectional lead screw 7031, a guide shaft 7032 and a guide seat 7033. The bidirectional lead screw 7031 is coupled to the driven pulley 7023. The guide seat 7033 includes a screw nut 70331 and a guide base 70332. The screw nut 70331 is disposed within the guide base 70332 and threadedly engaged with the bidirectional lead screw 7031. The guide shaft 7032 is disposed in parallel to the bidirectional lead screw 7031, and the guide seat 7033 is fitted over the guide shaft 7032. Since the screw nut 70331 is threadedly engaged with the bidirectional lead screw 7031, as a result of rotation of the bidirectional lead screw 7031, the guide seat 7033 can move forth and back in an axial direction of the bidirectional lead screw 7031 and the guide shaft 7032. Preferably, two guide shafts 7032 may be provided above and below the bidirectional lead screw 7031.

Figure 34:
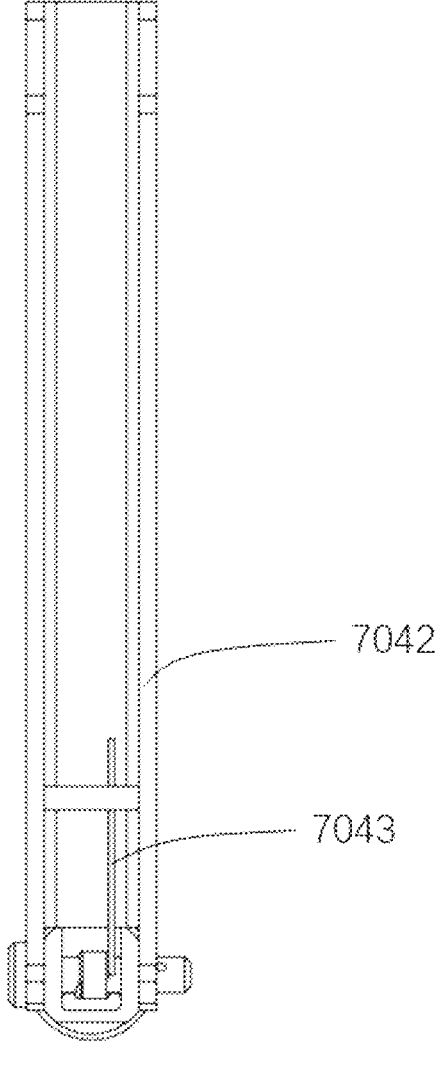
FIG. 34 schematically illustrates a support plate coupled to a resilient element in the seventh embodiment.

Referring to FIGS. 33 and 34, each support assembly 704 includes a support shaft 7041 and a support plate 7042. One end of the support shaft 7041 is coupled to the guide seat 7033, and the support plate 7042 is provided at the other end thereof. The support shaft 7041 can move together with the guide seat 7033. As the guide seat 7033 is moving forth and back along the bidirectional lead screw and the guide shaft 7032, the support shafts 7041 also move forth and back in the same way and thereby switch between the first and second positions. The support plate 7042 is rotatably coupled to the support shaft 7041 by a resilient element 7043, which can bias the support plate 7042 toward an orientation in which the support plate 7042 is perpendicular to the support shaft 7041.

The fixation bases mainly serve a supporting purpose. Preferably, the fixation bases include a middle fixation base 7051 and shaft end fixation bases 7052. The middle fixation base 7051 is located at a middle location of the fixation plate 701, and the shaft end fixation bases 7052 are located near the openings 7012 of the fixation plate 701. The guide shaft 7032 is secured at its opposite ends to the middle fixation base 7051 and the shaft end fixation bases 7052. The shaft end fixation bases 7052 define openings for passage of the support shafts 7041 therethrough.

During extension of the support assemblies 704 from the first position to the second position, the support plates 7042 will pivot, upon leaving the mounting/fixation plate 701, into perpendicularity to the support shafts 7041 and move into abutment with fixed shelves. During retraction of the support assemblies 704 from the second position to the first position, after the support plates 7042 come into contact with angled pates on the mounting/fixation plate 701, further retraction of the support assemblies 704 away from the shaft end fixation bases 7052 will lead to increasingly smaller angles of the support plates 7042 with respect to the support shafts 7041.

Referring to FIG. 33, the aerial stabilization mechanism 7 further includes position sensors 706 and proximity switches. The position sensors 706 are used to detect distances of the support assemblies 704 to fixed shelves 40 and may be implemented as infrared sensors or other sensors capable of acquiring position or distance information. The proximity switches are used to detect abutments of the support plates 7042 in the support assemblies 704 with the shelves and responsively send stop signals to the drive assembly 702.

Operation of the robot of this embodiment may involve movement of the transporting robot on the ground from an initial position to a specified position by means of the drive unit. The transporting robot then moves the cargo box delivery unit 3 to a specified height using the lifting module in the cargo box storing unit 2, and under the action of the drive assembly 702, the support plates 7042 in the support assemblies 704 at the opposite sides of the aerial stabilization mechanism 7 are biased by the resilient elements into perpendicularity to the support shafts 7041 and move into abutment with the fixed shelves 40. Meanwhile, the rotational device 561 in the cargo box delivery unit 3 rotates telescopic fork teeth to a specified angular position, and the fork tooth modules in the cargo box delivery unit 3 are extended and retracted to fetch a cargo box 4 from a fixed shelf 40. After the cargo box 4 is fetched, the support assemblies 704 in the aerial stabilization mechanism 7 returns from the second position to the first position, and the lifting module of the cargo box storing unit 2 moves the hook-and-pull fork tooth modules 520 and the cargo box 4 to a specified height, where the rotational device 561 in the self-adaptive cargo box delivery unit 5 rotates them to another specified angular position. The cargo box delivery unit then places the cargo box onto a panel 212.

The preferred specific embodiments of the invention have been described in detail above. It is to be understood that numerous modifications and variations can be made by those ordinary skilled in the art in accordance with the concepts of the present invention without any inventive effort. Hence, the technical solutions that may be derived by those skilled in the art according to the concepts of the present invention on the basis of the prior art through logical analysis, reasoning and limited experiments should be within the scope of protection defined by the claims.

The invention claimed is:

1. A robot for transporting cargo boxes, comprising a drive unit, a cargo box storing unit and a cargo box delivery unit, wherein the drive unit carries the cargo box storing unit and the cargo box delivery unit and moves them jointly therewith; the cargo box storing unit comprises a plurality of cargo box storing spaces; the cargo box delivery unit is coupled to the cargo box storing unit and configured to move along the cargo box storing unit in a vertical direction and transfer the cargo boxes between the cargo box storing spaces and a shelf, wherein the cargo box delivery unit comprises a hook-and-pull fork tooth module, the hook-and-pull fork tooth module configured to extend from the cargo box delivery unit into the shelf or the cargo box storing spaces, retract to the cargo box delivery unit and, during an extension or retraction, drive the cargo boxes to move therewith to transfer the cargo boxes from the cargo box delivery unit to the shelf or the cargo box storing spaces or from the shelf or the cargo box storing spaces to the cargo box delivery unit.

2. The robot for transporting cargo boxes of claim 1, wherein the cargo box delivery unit comprises an underframe and a baseplate, the baseplate disposed on the underframe, the hook-and-pull fork tooth module disposed on the baseplate, the underframe provided thereon with a rotational device configured to be able to drive the baseplate to rotate, thereby causing the hook-and-pull fork tooth module to rotate to a predetermined angle.

3. The robot for transporting cargo boxes of claim 1, wherein the drive unit comprises a chassis frame, a first drive assembly and a second drive assembly disposed in opposition to each other on the chassis frame, and a cantilever assembly disposed at a front end of the chassis frame, the first drive assembly comprising a first cantilever articulated to a bearing seat, the second drive assembly comprising a second cantilever articulated to a bearing seat, the cantilever assembly comprising a third cantilever articulated to a bearing seat, center points of articulation of the first cantilever, the second cantilever and the third cantilever defining a triangular articulating structure.

4. The robot for transporting cargo boxes of claim 3, wherein the cargo box storing unit comprises a gantry module, a lifting module, a lifting-drive module and a gantry mounting module, the gantry module comprising the plurality of cargo box storing spaces which are arranged in a vertical direction, the lifting module disposed on one side of the gantry module, coupled to the cargo box delivery unit and configured to drive the cargo box delivery unit move in the vertical direction, the lifting-drive module coupled to the lifting module and configured to drive the lifting module to move, the gantry mounting module disposed at a bottom of the gantry module and fixedly coupled to the chassis frame.

5. The robot for transporting cargo boxes of claim 1, wherein the robot further comprises an aerial stabilization mechanism fixedly coupled to the cargo box delivery unit and configured to abut against shelves/walls on opposite sides of the robot.

6. The robot for transporting cargo boxes of claim 5, wherein the aerial stabilization mechanism comprises a mounting/fixation plate coupled to the cargo box delivery unit, the mounting/fixation plate disposed therein with a pair of support assemblies, the support assemblies configured to extend out of the mounting/fixation plate through openings at opposite ends thereof to abut against the shelves/walls.

7. The robot for transporting cargo boxes of claim 6, wherein the aerial stabilization mechanism further comprises a drive assembly and a transmission mechanism, all the drive assembly, the transmission mechanism, the middle fixation base and the shaft end fixation bases mounted to the mounting/fixation plate, the drive assembly comprising a motor, a drive pulley coupled to the motor, and a driven pulley coupled to the drive pulley,

the transmission mechanism comprising a bidirectional lead screw, a guide shaft and a guide seat, the guide seat comprising a guide base and a screw nut disposed within the guide base, the bidirectional lead screw coupled to the driven pulley, the bidirectional lead screw disposed in the guide base and threadedly engaged with the screw nut of the guide seat, the guide shaft disposed in parallel to the bidirectional lead screw, the guide base fitter over the guide shaft, the support assemblies each comprising a support shaft and a support plate disposed at an end of the support shaft, one end of the support shaft coupled to the guide seat and moving forth and back with the guide seat.

8. The robot for transporting cargo boxes of claim 1, wherein the hook-and-pull fork tooth module comprises a telescopic fork tooth device having at least one telescopic stroke, the telescopic fork tooth device comprising a fixed fork tooth and at least one telescopically movable fork tooth provided at an inner side of the fixed fork tooth, the movable fork tooth configured to extend or retract in a lengthwise direction of the fixed fork tooth.

9. The robot for transporting cargo boxes of claim 8, wherein the hook-and-pull fork tooth module further comprises a swinging rod device, the swinging rod device disposed on a movable fork tooth corresponding to a last stage stroke of the telescopic stroke and located at an end of the movable fork tooth where it is disposed directed toward a direction of extension, the swinging rod device comprising a swinging rod pivotable relative to the direction of extension.

10. The robot for transporting cargo boxes of claim 9, wherein the hook-and-pull fork tooth module further comprises a push plate, the push plate disposed on the movable fork tooth corresponding to the last stage stroke of the telescopic stroke and located at an end of the movable fork tooth where it is disposed directed away from the direction of extension, the push plate configured to push a cargo box in the cargo box delivery unit during its movement with the movable fork tooth.

11. The robot for transporting cargo boxes of claim 10, wherein the cargo box delivery unit further comprises an extension-retraction drive module for driving the hook-and-pull fork tooth module to telescope, the extension-retraction drive module comprising a drive component and a transmission mechanism coupled to the drive component, the transmission mechanism coupled to the movable fork tooth.

12. The robot for transporting cargo boxes of claim 11, wherein the telescopic fork tooth device comprises an inner fork tooth, an intermediate fork tooth and an outer fork tooth, the outer fork tooth serving as the fixed fork tooth, the intermediate fork tooth disposed at an inner side of the outer fork tooth and configured to be extendible and retractable, the inner fork tooth disposed at an inner side of the intermediate fork tooth and configured to be extendible and retractable, the swinging rod device disposed at an end of the inner fork tooth directed toward the direction of extension, the push plate disposed at an end of the inner fork tooth directed away from the direction of extension, the intermediate fork tooth coupled to the transmission mechanism.

13. The robot for transporting cargo boxes of claim 12, wherein the intermediate fork tooth is provided thereon with a first timing pulley, a tensioning means, a timing belt and a second timing pulley, the first timing pulley and the second timing pulley disposed respectively on opposite ends of the intermediate fork tooth along the direction of extension, the timing belt wound into an open ring, with its opposite ends being both secured to the tensioning means, the tensioning means fixed at a side between the intermediate fork tooth and the inner fork tooth, central positions of the opposite ends of the timing belt aligned with central positions of the first timing pulley and the second timing pulley.

14. The robot for transporting cargo boxes of claim 10, wherein the telescopic fork tooth device comprises the fixed fork tooth, a first fork tooth, a second fork tooth and a third fork tooth, the first fork tooth disposed at an inner side of the fixed fork tooth and configured to be extendible and retractable, the second fork tooth disposed at an inner side of the first fork tooth and configured to be extendible and retractable, the third fork tooth disposed at an inner side of the second fork tooth and configured to be extendible and retractable, the swinging rod device disposed at an end of the third fork tooth directed toward the direction of extension, the push plate disposed at an end of the third fork tooth directed away from the direction of extension, the first fork tooth coupled to the transmission mechanism.

15. The robot for transporting cargo boxes of claim 14, wherein the first fork tooth and the second fork tooth both comprise a third timing pulley, a tensioning means, a timing belt and a fourth timing pulley, the third timing pulleys and the fourth timing pulleys disposed at opposite ends of the first fork tooth and the second fork tooth, respectively, the tensioning means respectively mounted to the fixed fork tooth and the first fork tooth, the timing belts wound into open rings with their opposite ends being secured to the tensioning means, the tensioning means fixed at a middle position between the fixed fork tooth and the first fork tooth and at a middle position between the first fork tooth and the second fork tooth, central positions of opposite ends of the timing belts aligned with central positions of the third timing pulleys and the fourth timing pulleys.

16. The robot for transporting cargo boxes of claim 10, wherein the cargo box delivery unit further comprises a follower mechanism, which is used to carry the cargo boxes and configured to move with the telescopic fork tooth device into abutment with the shelf.

17. The robot for transporting cargo boxes of claim 16, wherein the cargo box delivery unit further comprises an extension-retraction slide rail module, the extension-retraction slide rail module comprising a slide rail and at least one slider slideable on the slide rail, the slider coupled to the follower mechanism so that the follower mechanism slide on the slide rail.

18. The robot for transporting cargo boxes of claim 10, wherein the fixed fork tooth is configured to be movable in a direction perpendicular to the direction of extension-thereby adapting a width of the hook-and-pull fork tooth module to a cargo box of a different width.

19. The robot for transporting cargo boxes of claim 18, wherein the cargo box delivery unit further comprises a clamp holding drive module, the clamp holding drive module comprising a drive component and a transmission mechanism, the drive component coupled to the transmission mechanism, the transmission mechanism coupled to the fixed fork tooth, the clamp holding drive module configured to drive the fixed fork tooth to move in the direction perpendicular to the direction of extension.

20. The robot for transporting cargo boxes of claim 19, wherein the cargo box delivery unit further comprises a clamp holding slide rail module, the clamp holding slide rail module comprising a guide rail and a slider slideable on the guide rail, the slider coupled to the fixed fork tooth so that the fixed fork tooth slide on the guide rail.

* * * * *